Feb. 5, 1946.   C. S. McCHESNEY   2,394,464
TIRE BUILDING MACHINE
Filed Oct. 3, 1942   23 Sheets-Sheet 3

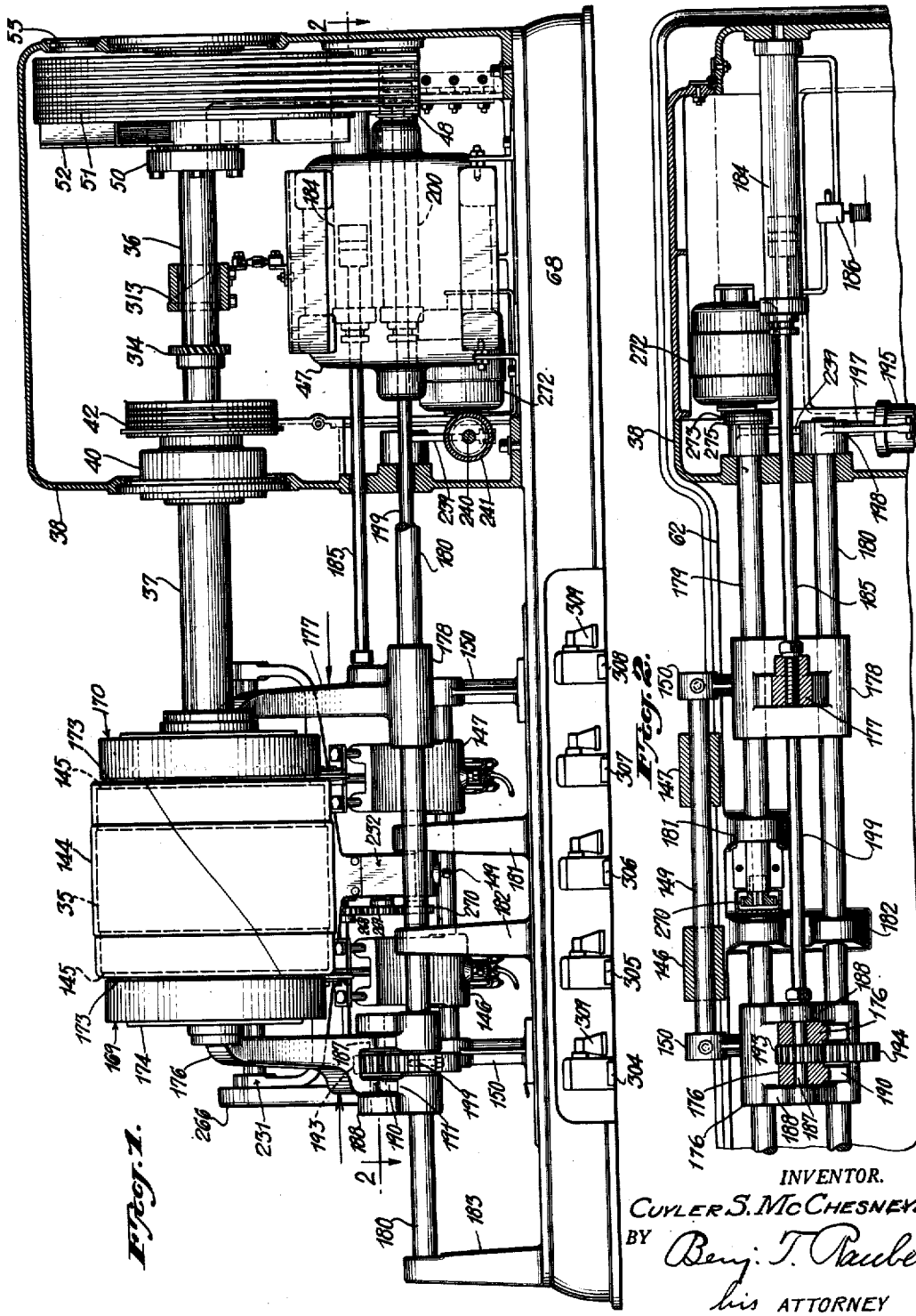

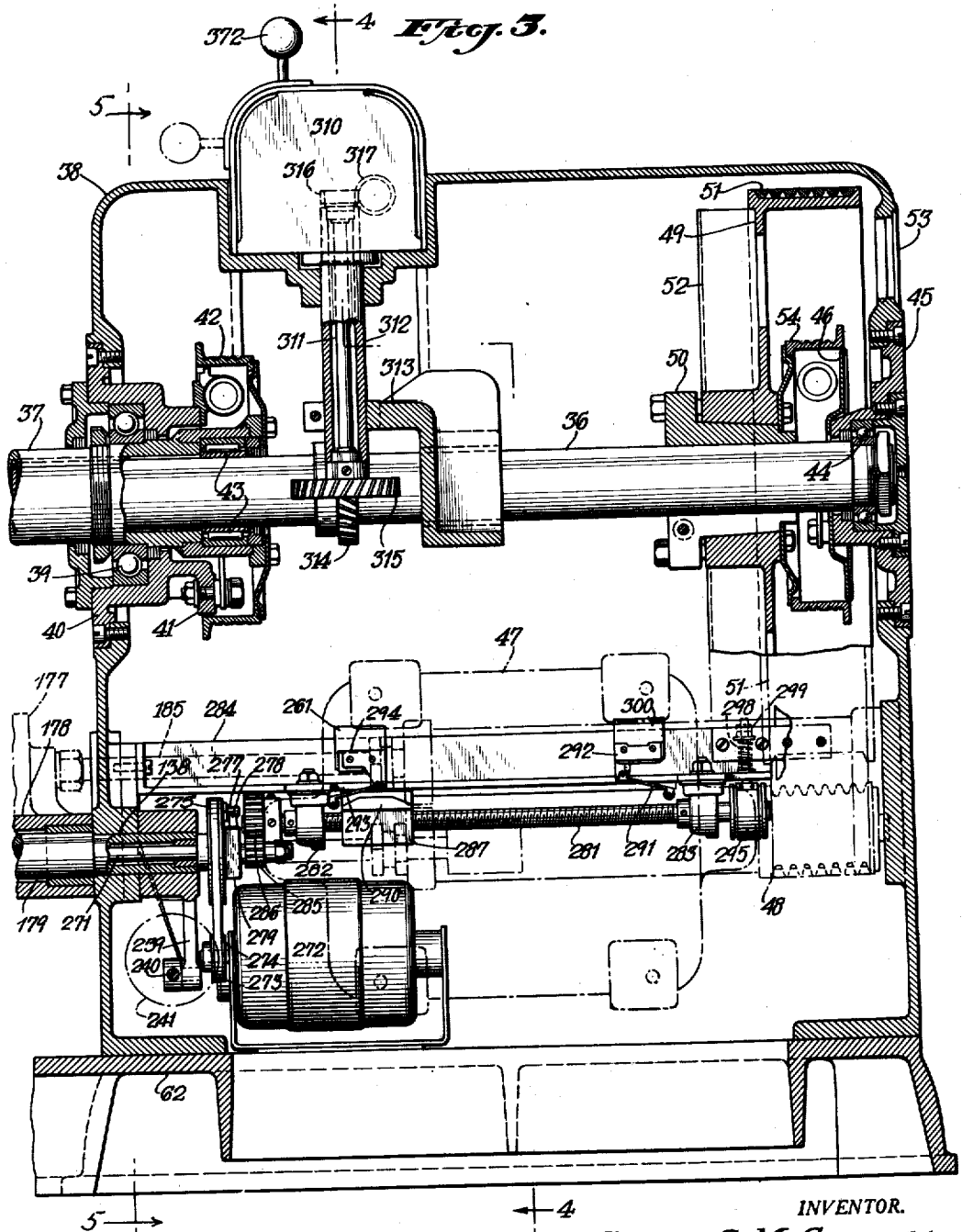

INVENTOR.
CUYLER S. McCHESNEY.
BY Benj. T. Rauber
his ATTORNEY

Feb. 5, 1946. C. S. McCHESNEY 2,394,464
TIRE BUILDING MACHINE
Filed Oct. 3, 1942 23 Sheets-Sheet 4
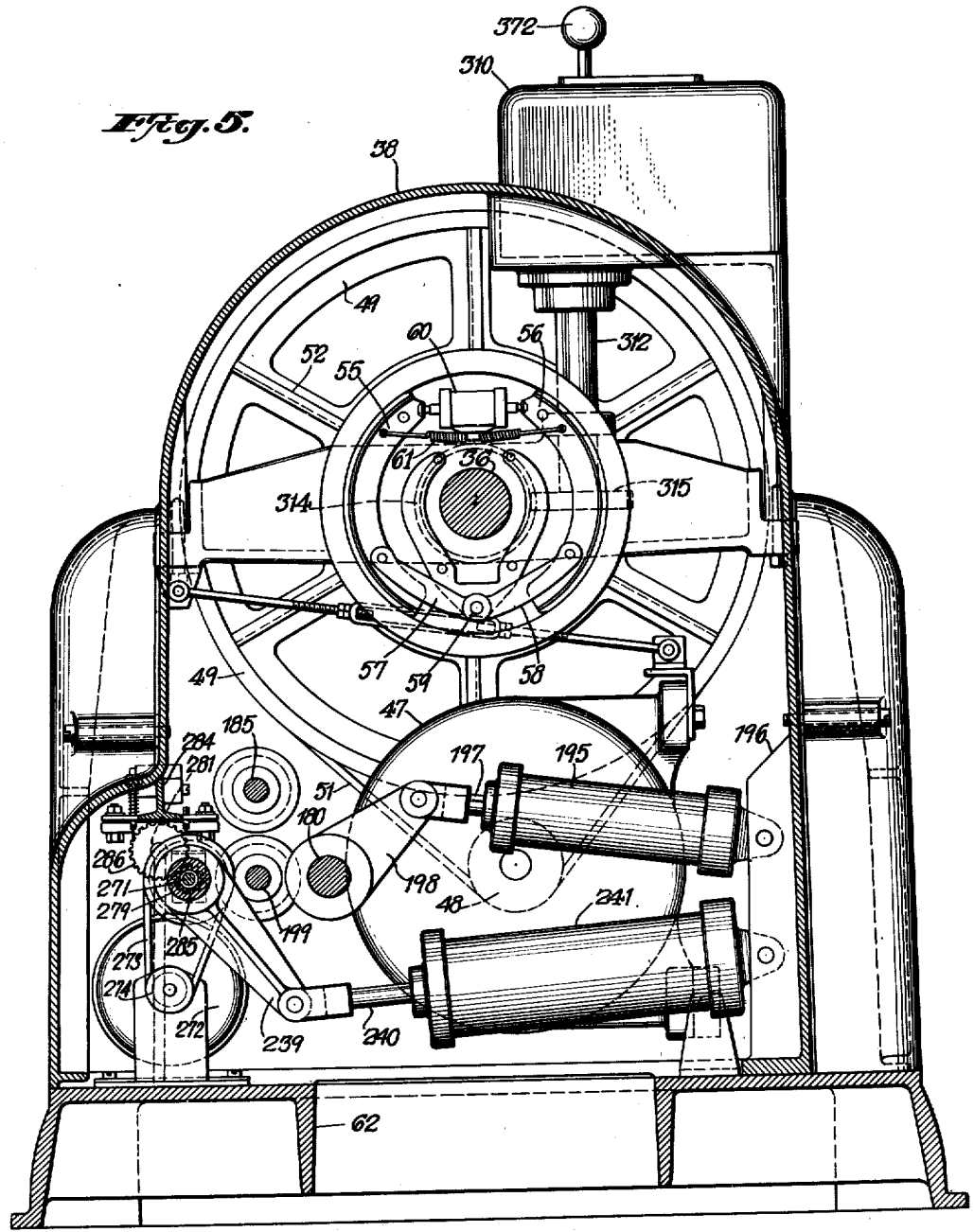
Fig. 5.
INVENTOR.
CUYLER S. McCHESNEY.
BY
his ATTORNEY

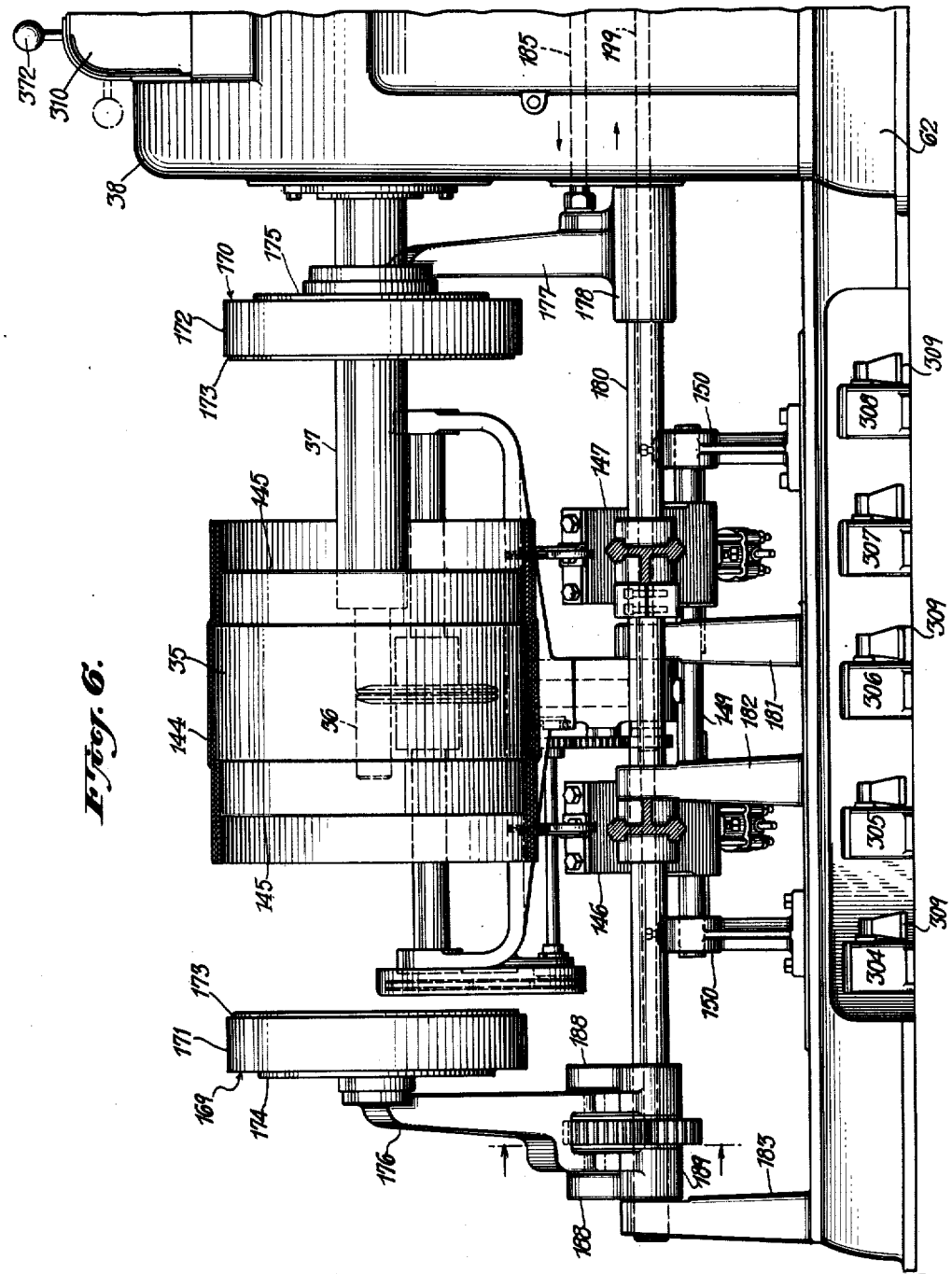

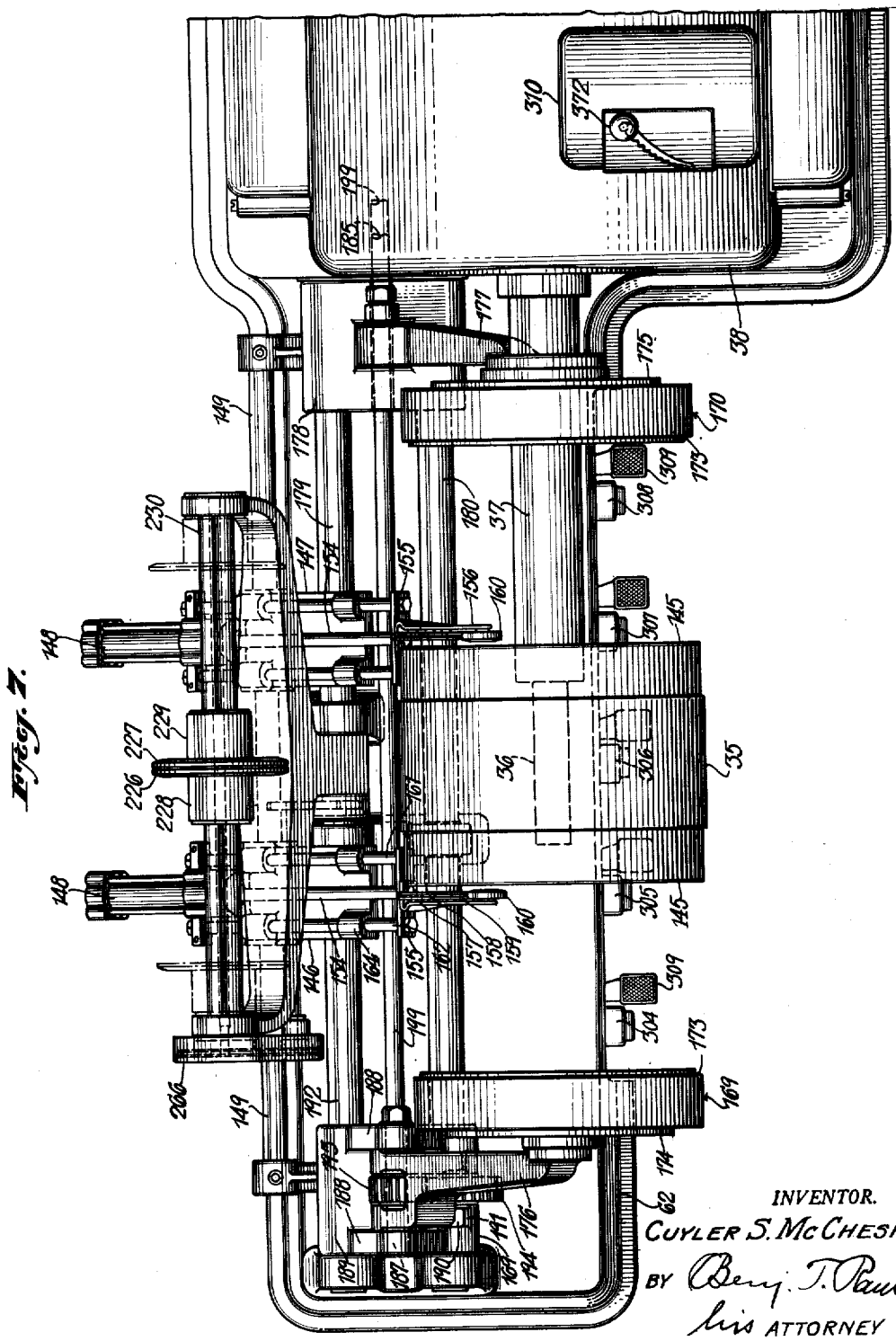

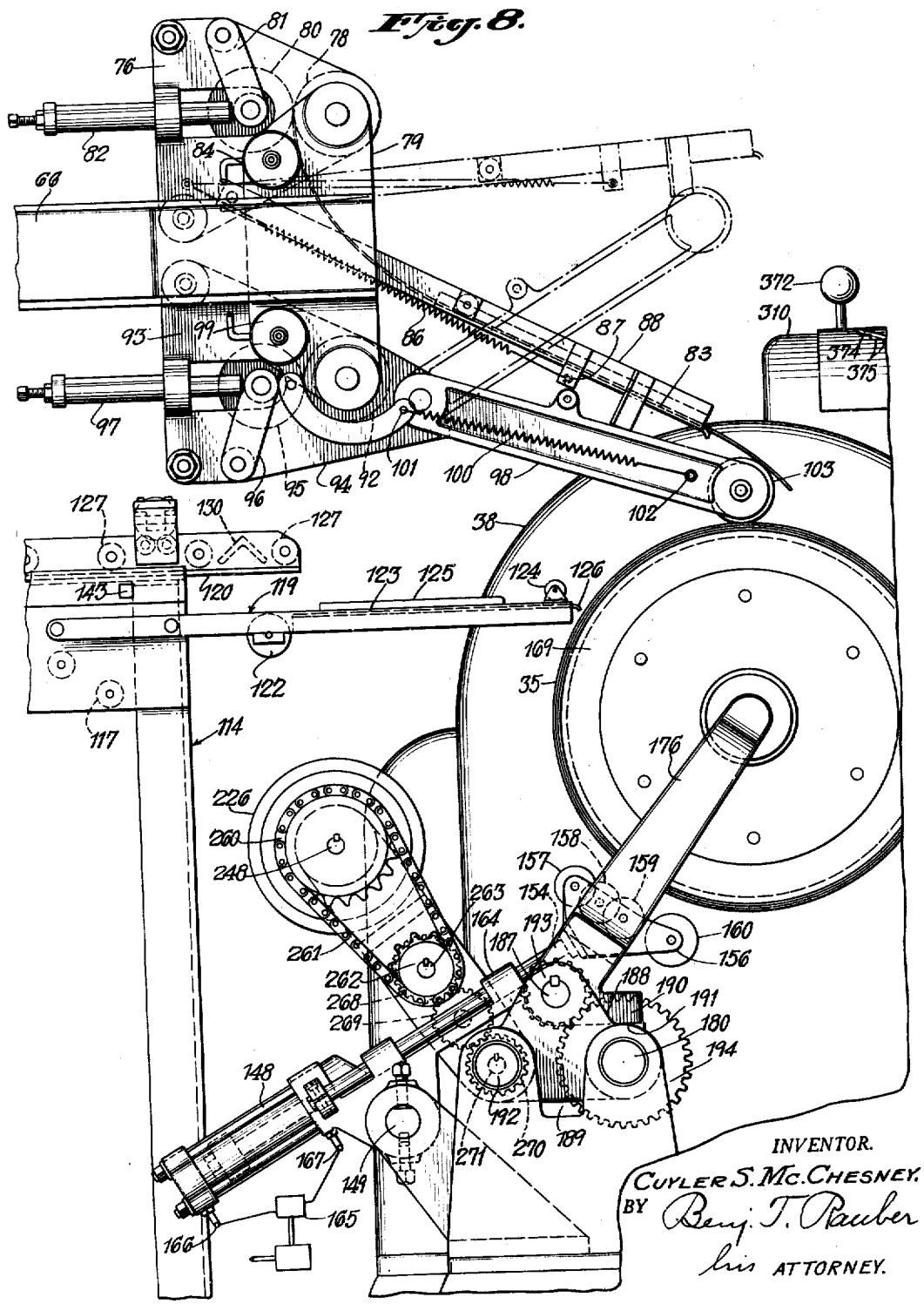

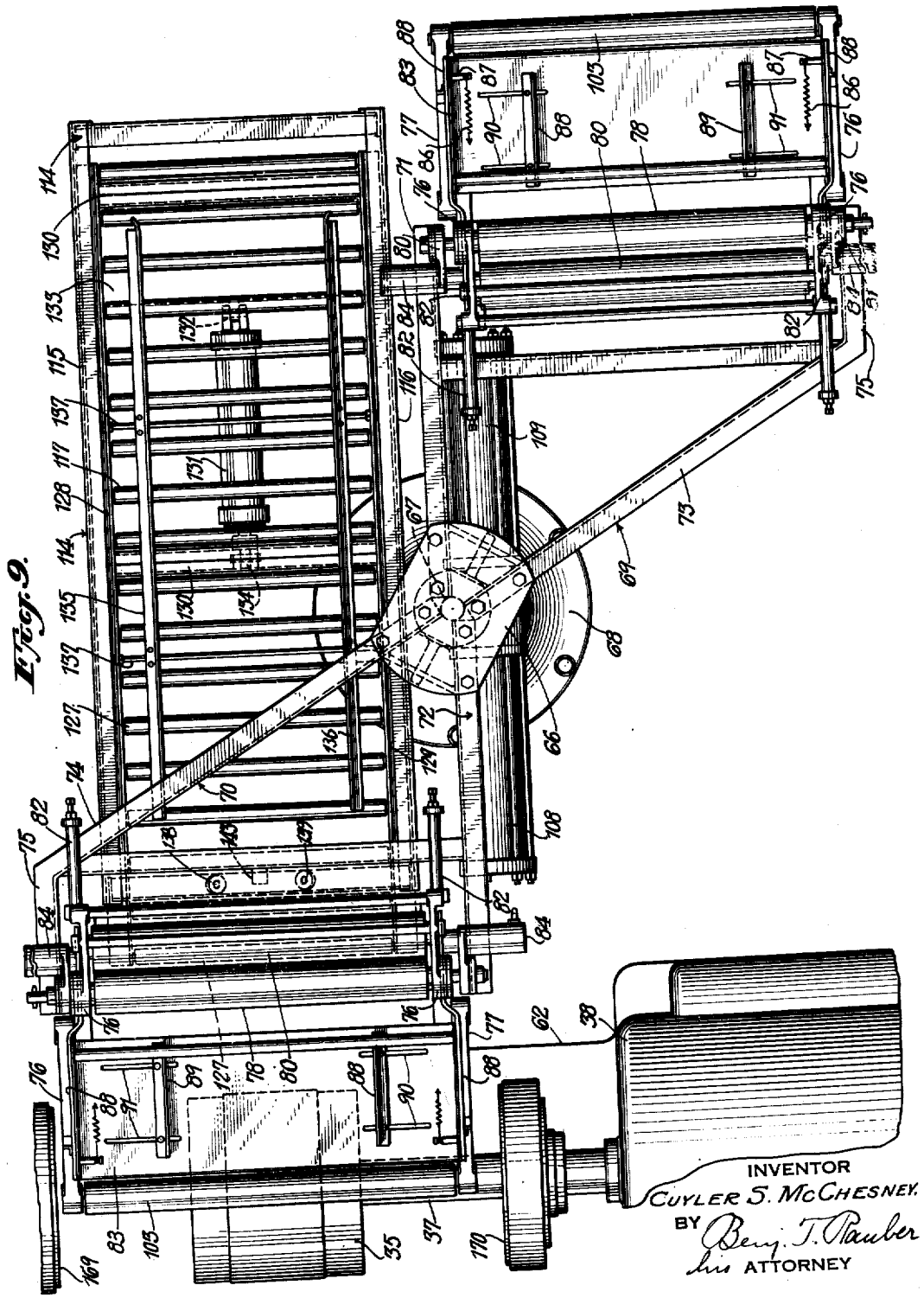

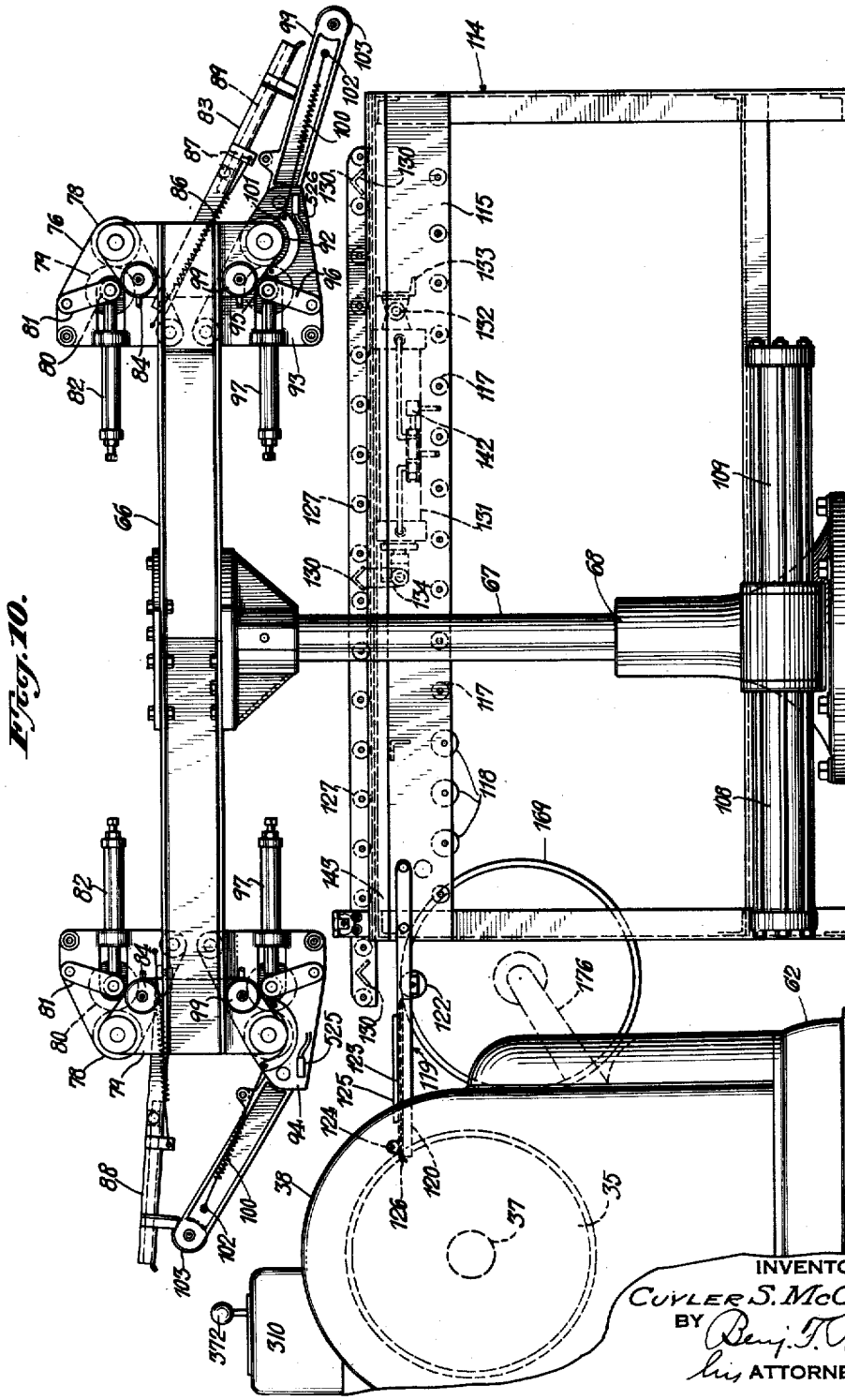

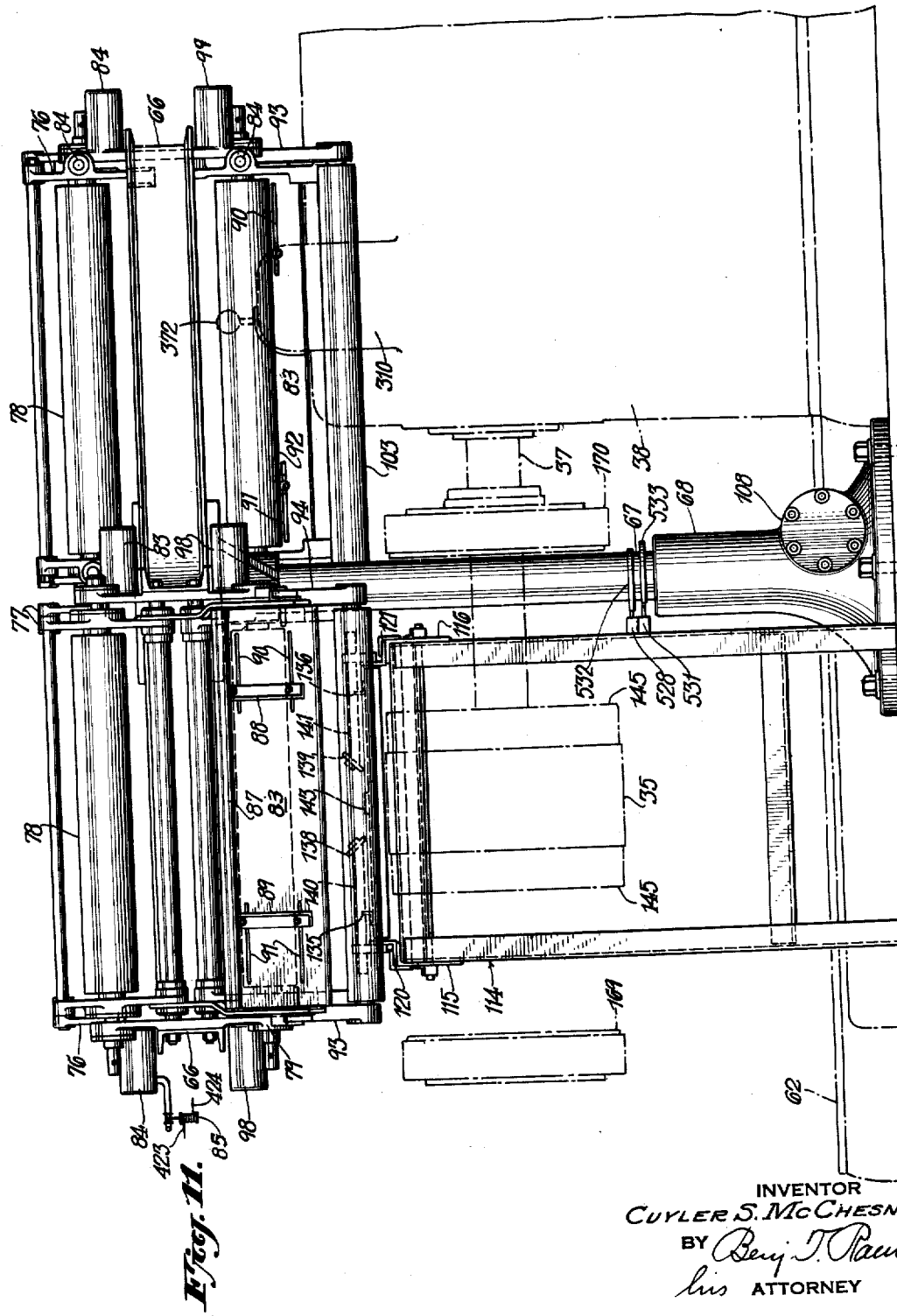

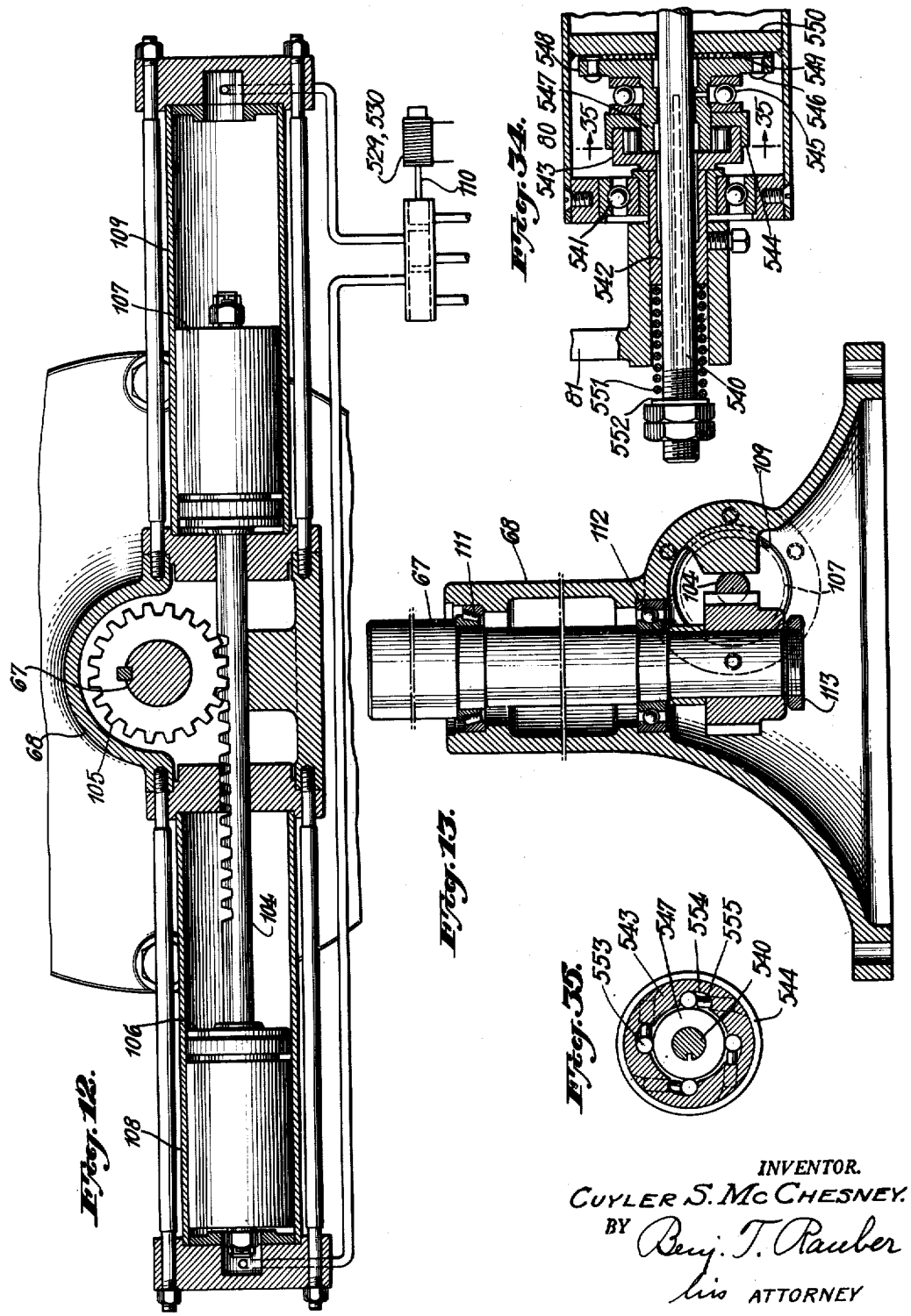

Feb. 5, 1946.     C. S. McCHESNEY     2,394,464
TIRE BUILDING MACHINE
Filed Oct. 3, 1942     23 Sheets-Sheet 12
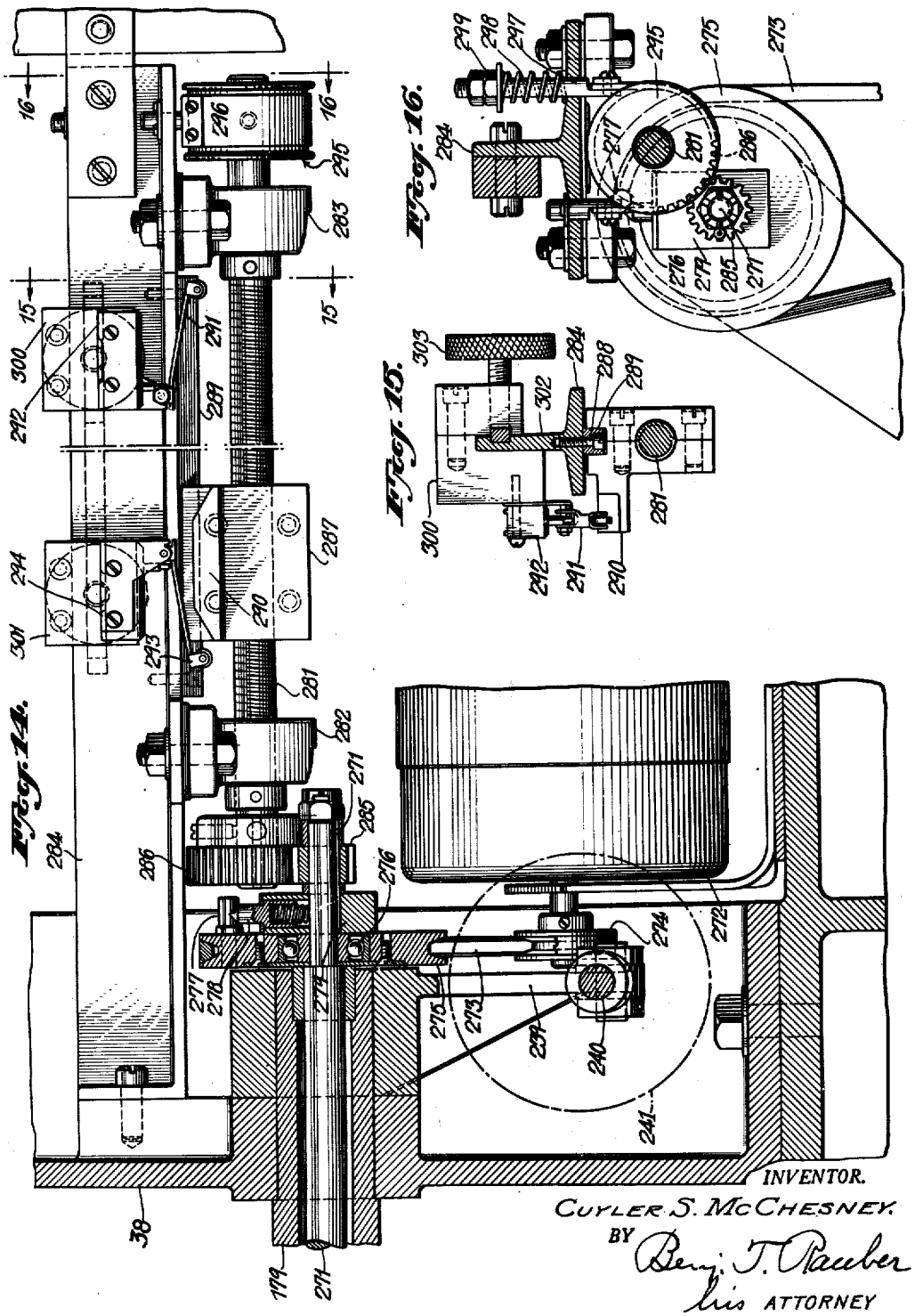
INVENTOR.
CUYLER S. McCHESNEY.
BY Benj. T. Rauber
his ATTORNEY

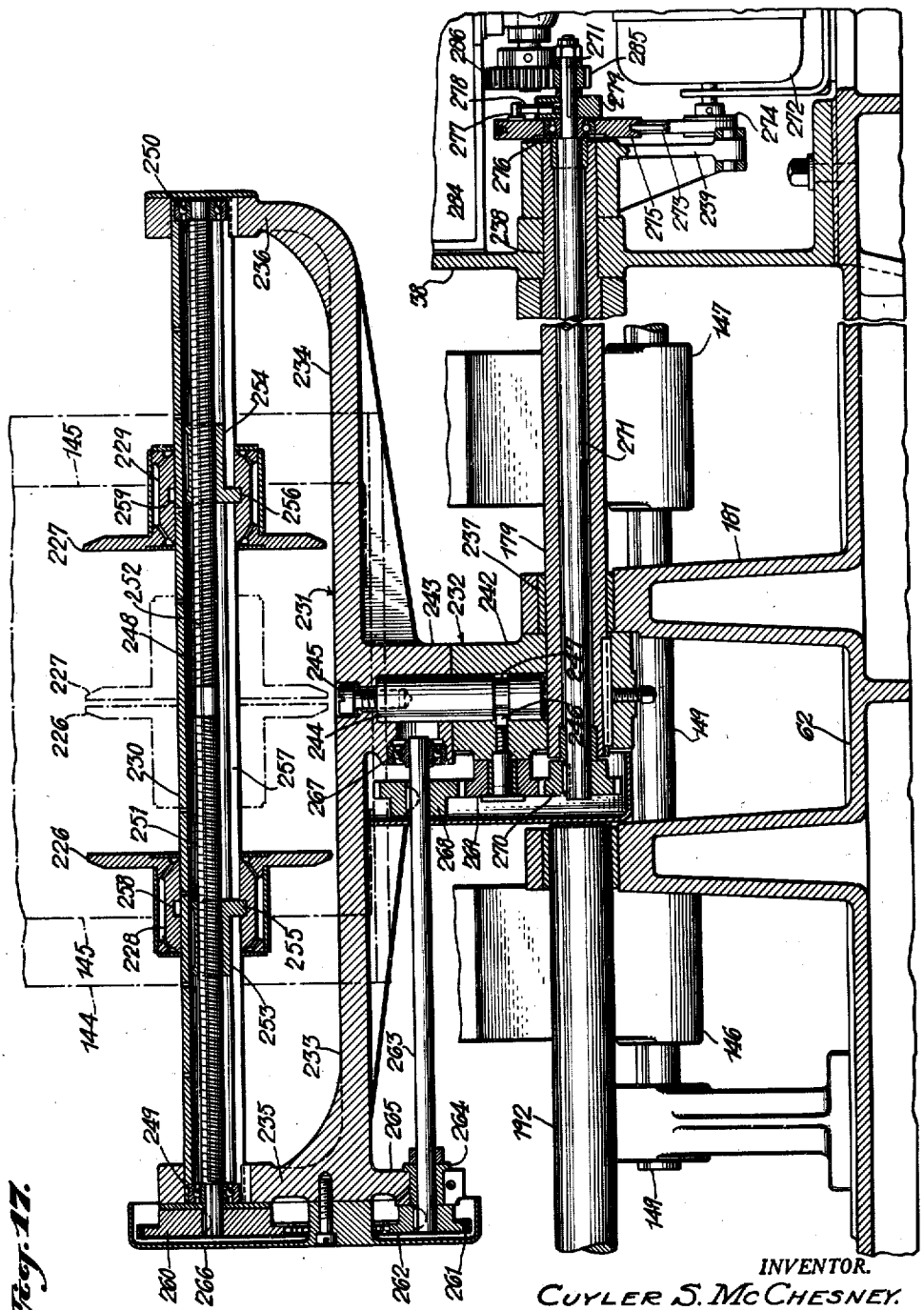

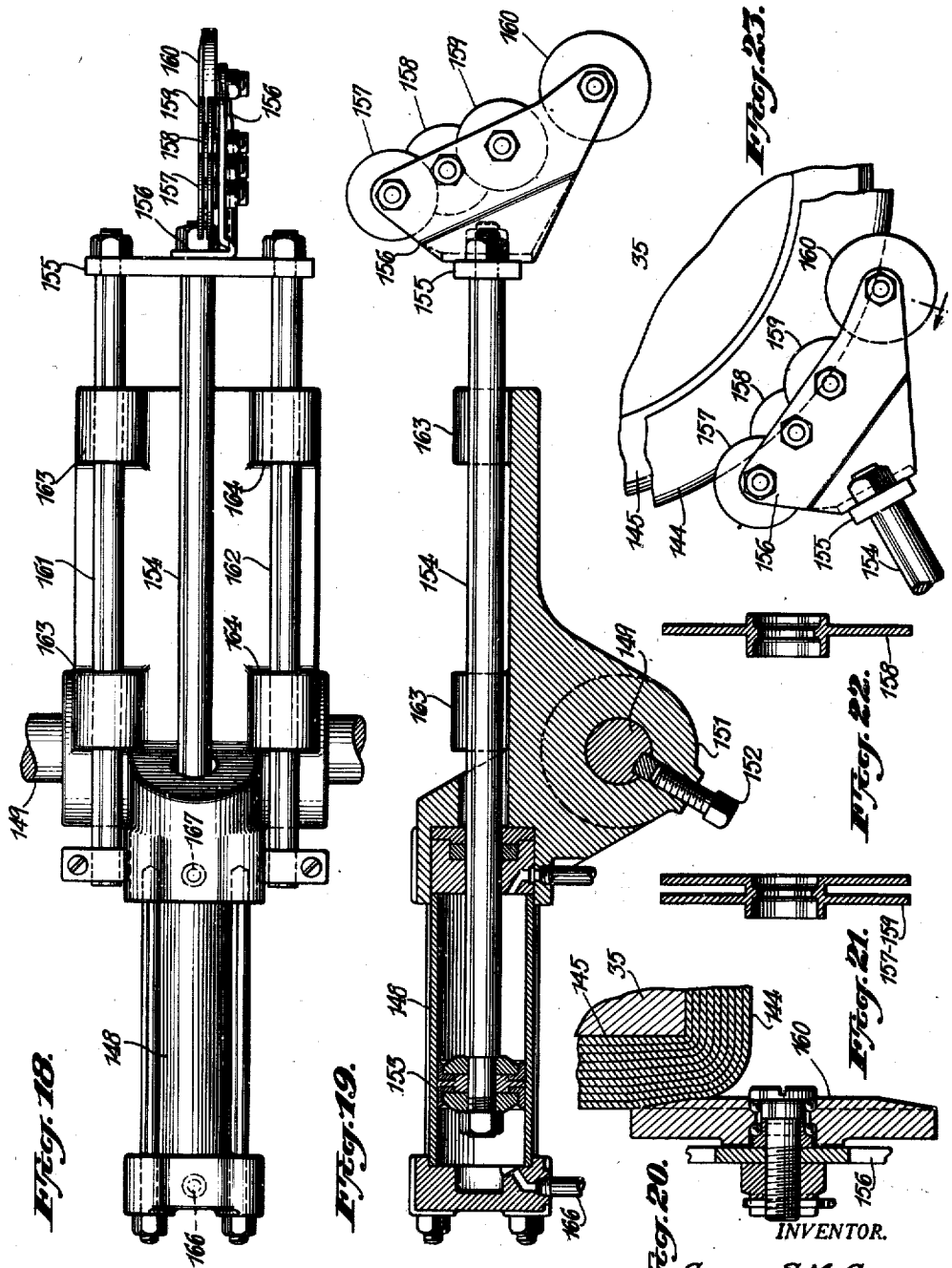

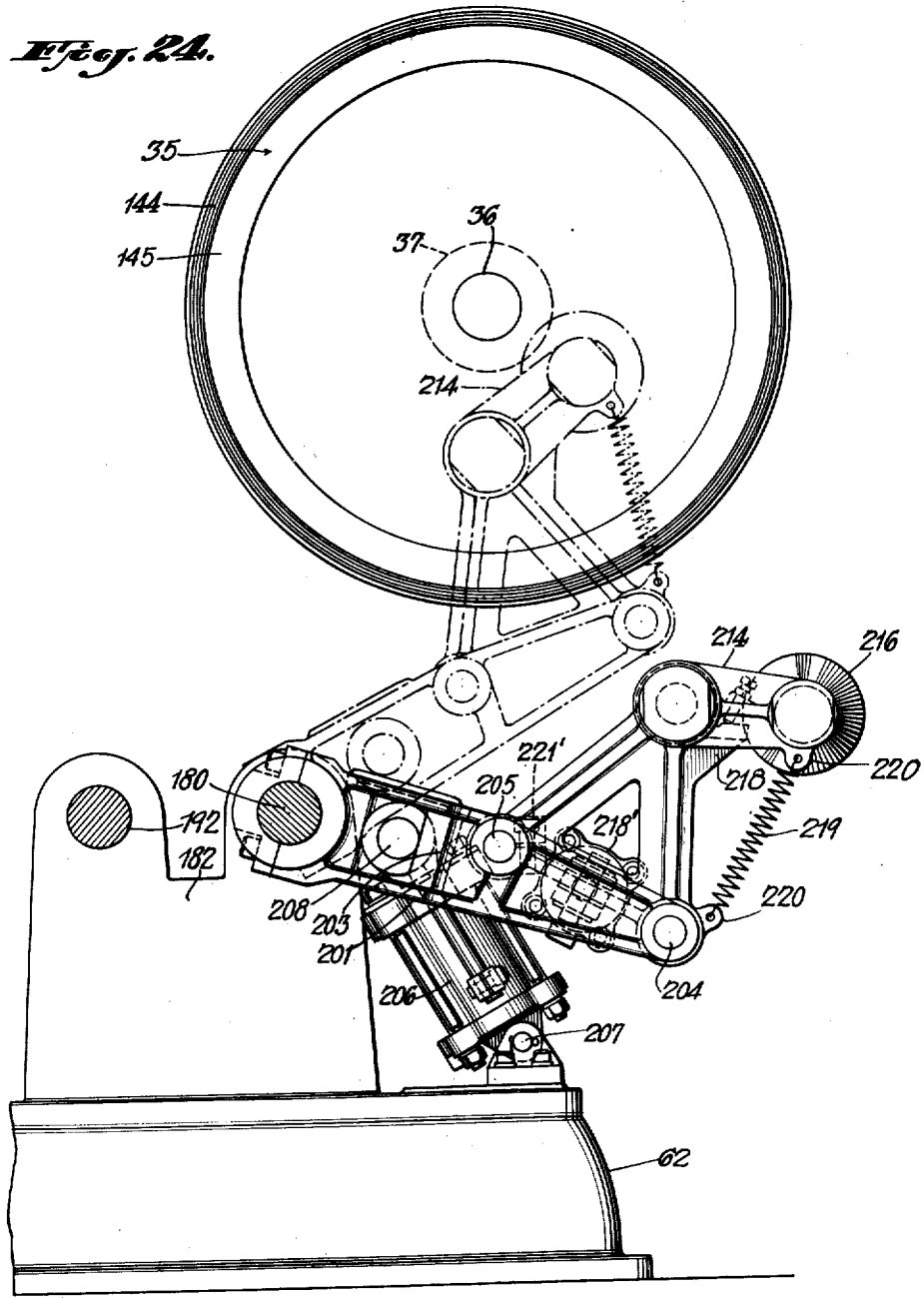

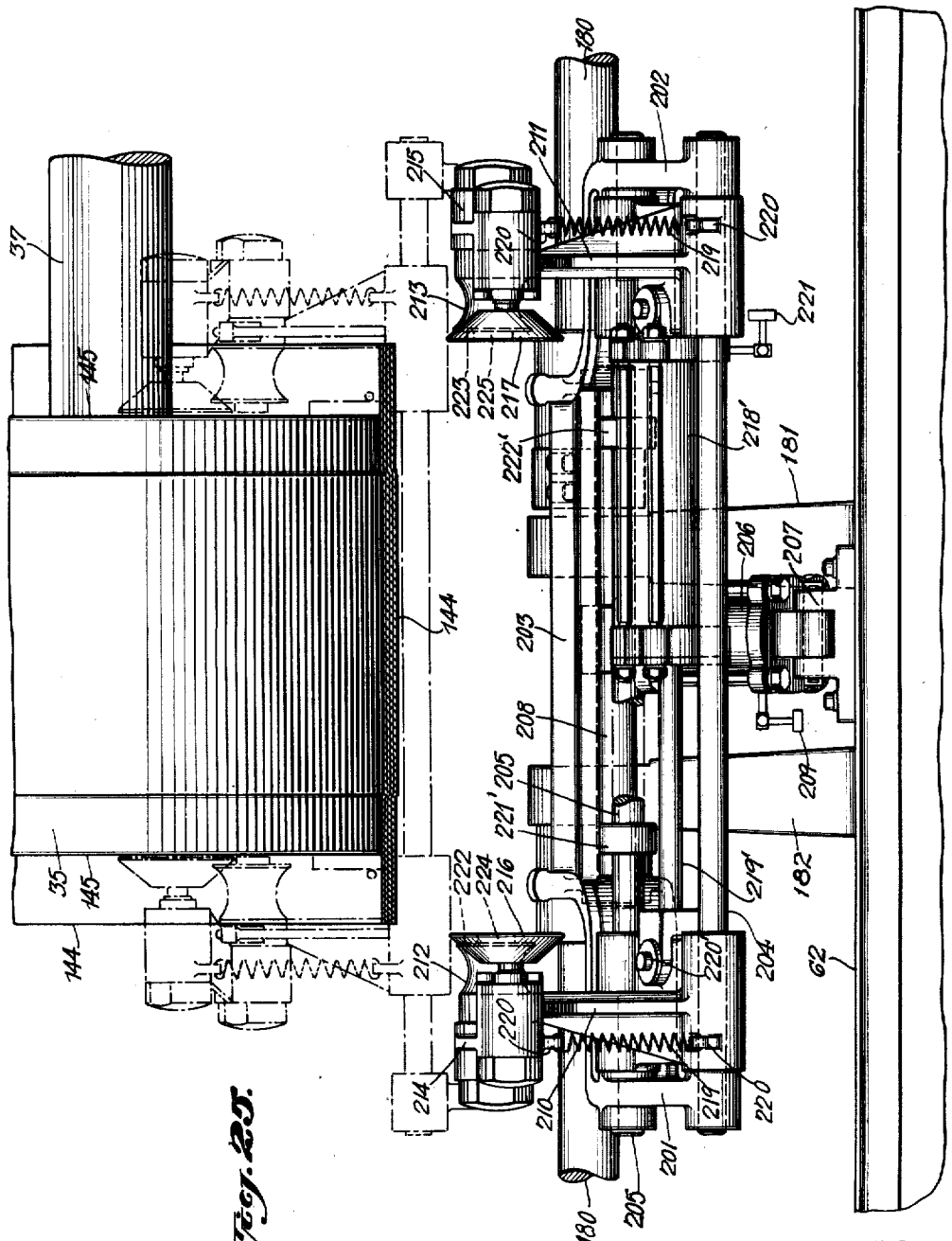

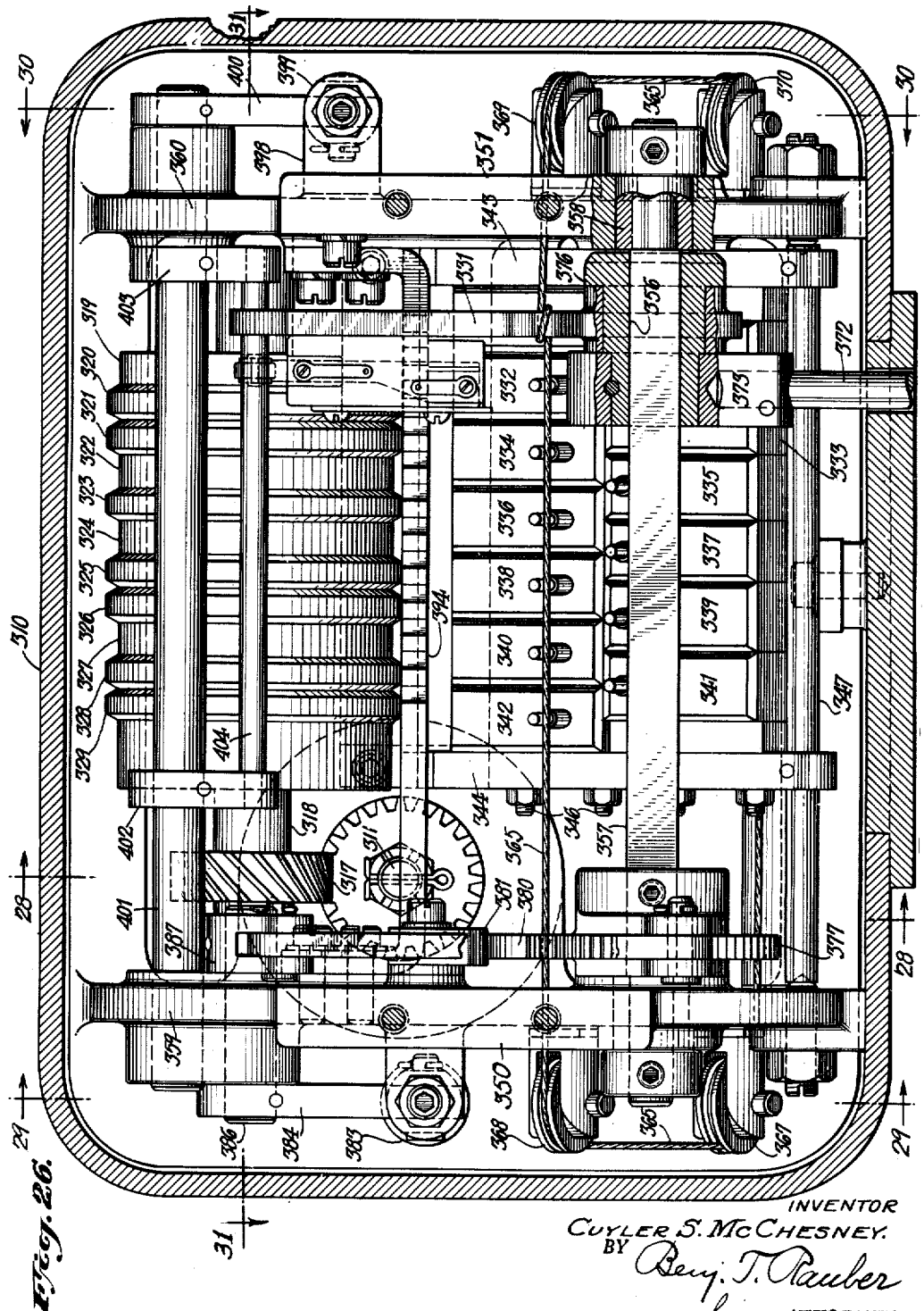

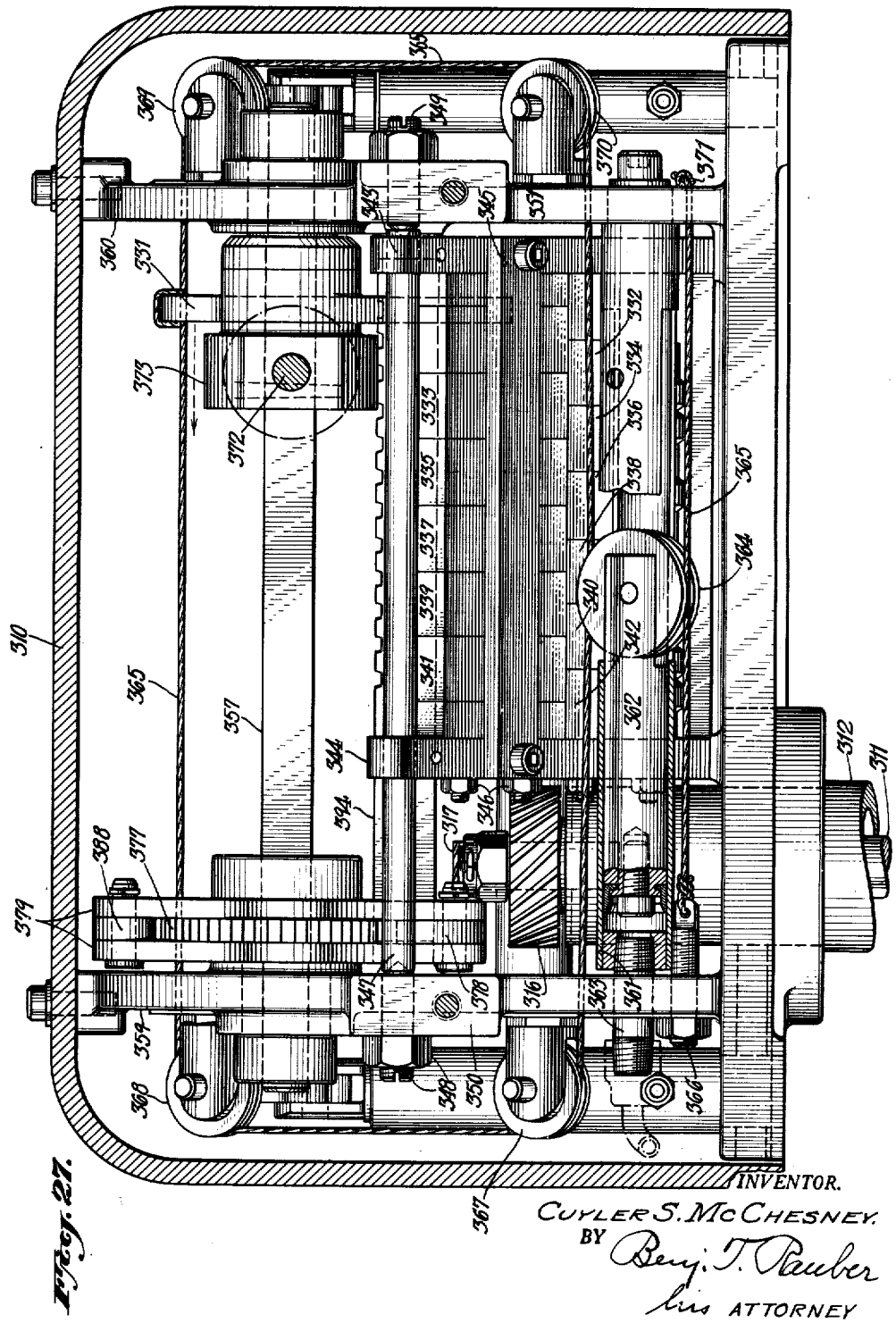

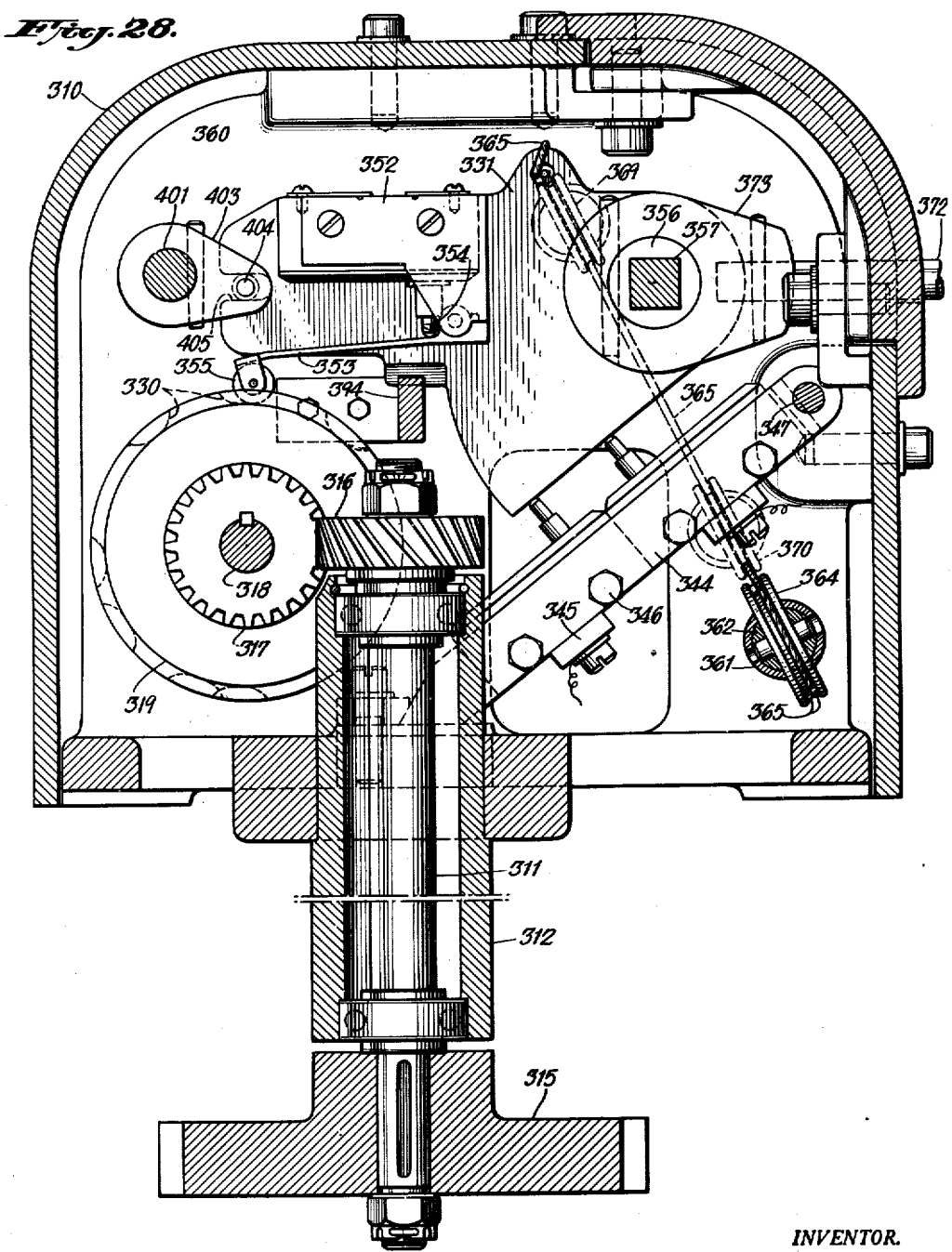

Feb. 5, 1946.   C. S. McCHESNEY   2,394,464
TIRE BUILDING MACHINE
Filed Oct. 3, 1942   23 Sheets-Sheet 20

INVENTOR.
BY CUYLER S. McCHESNEY.
Benj. T. Rauber
ATTORNEY

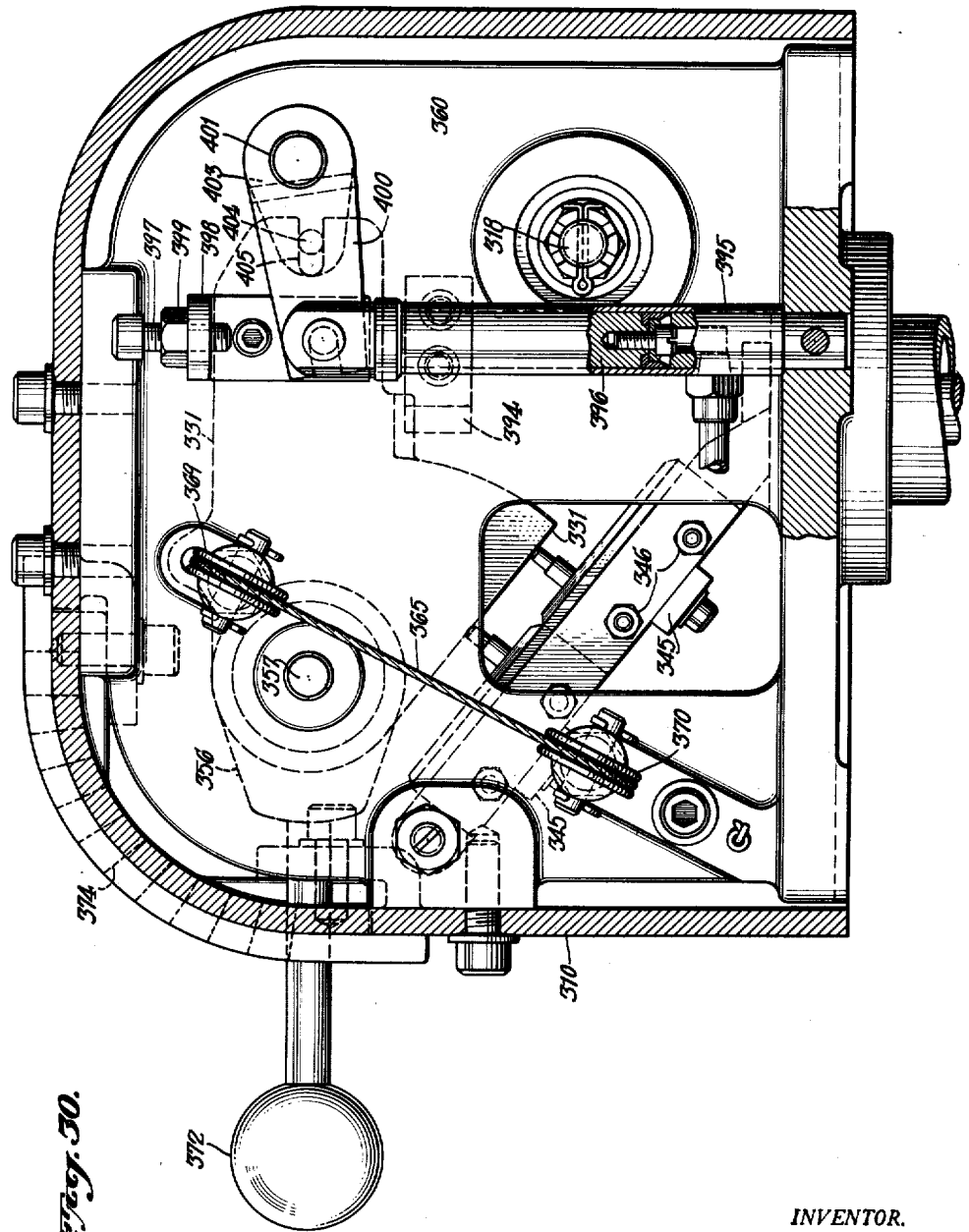

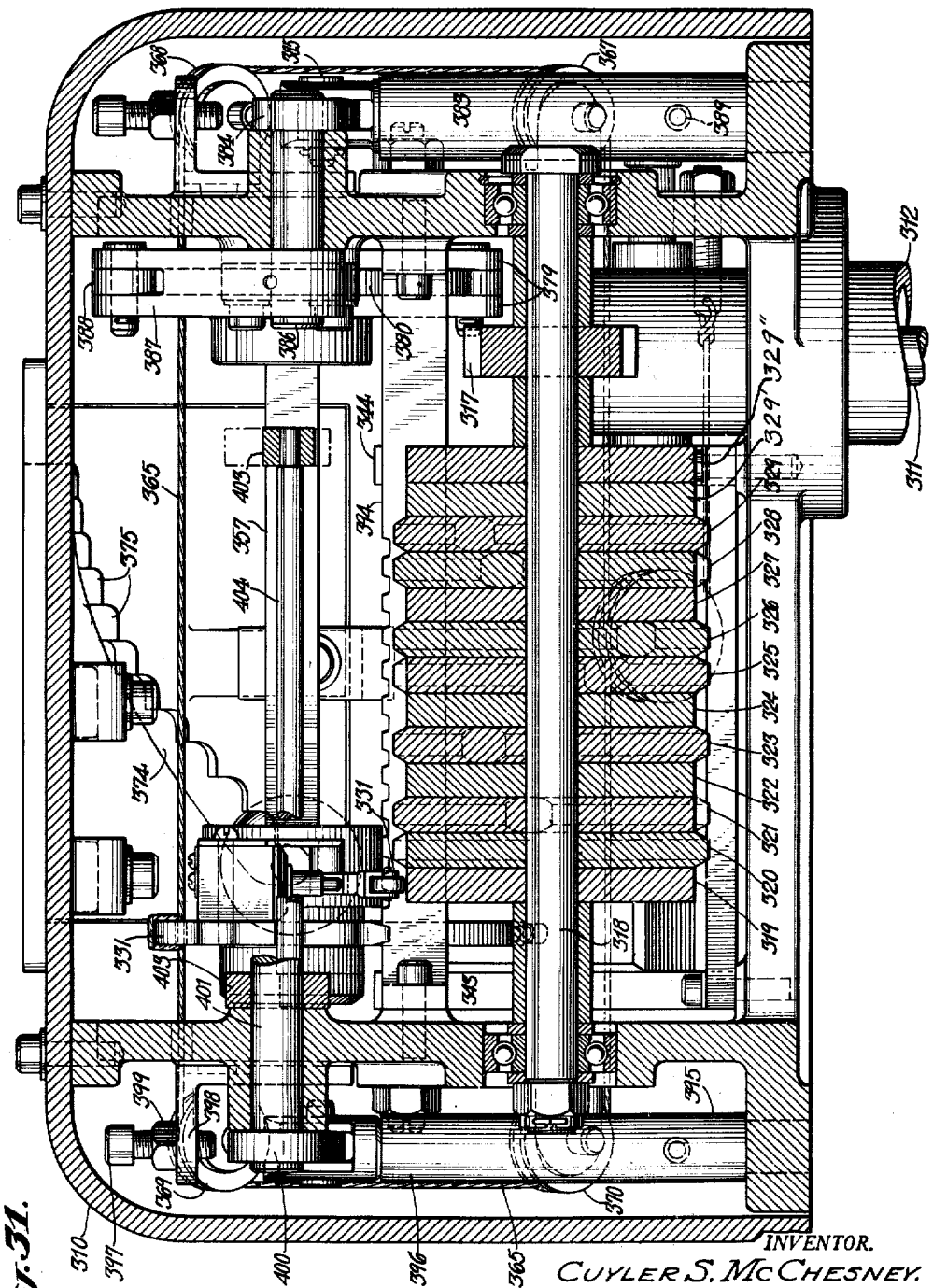

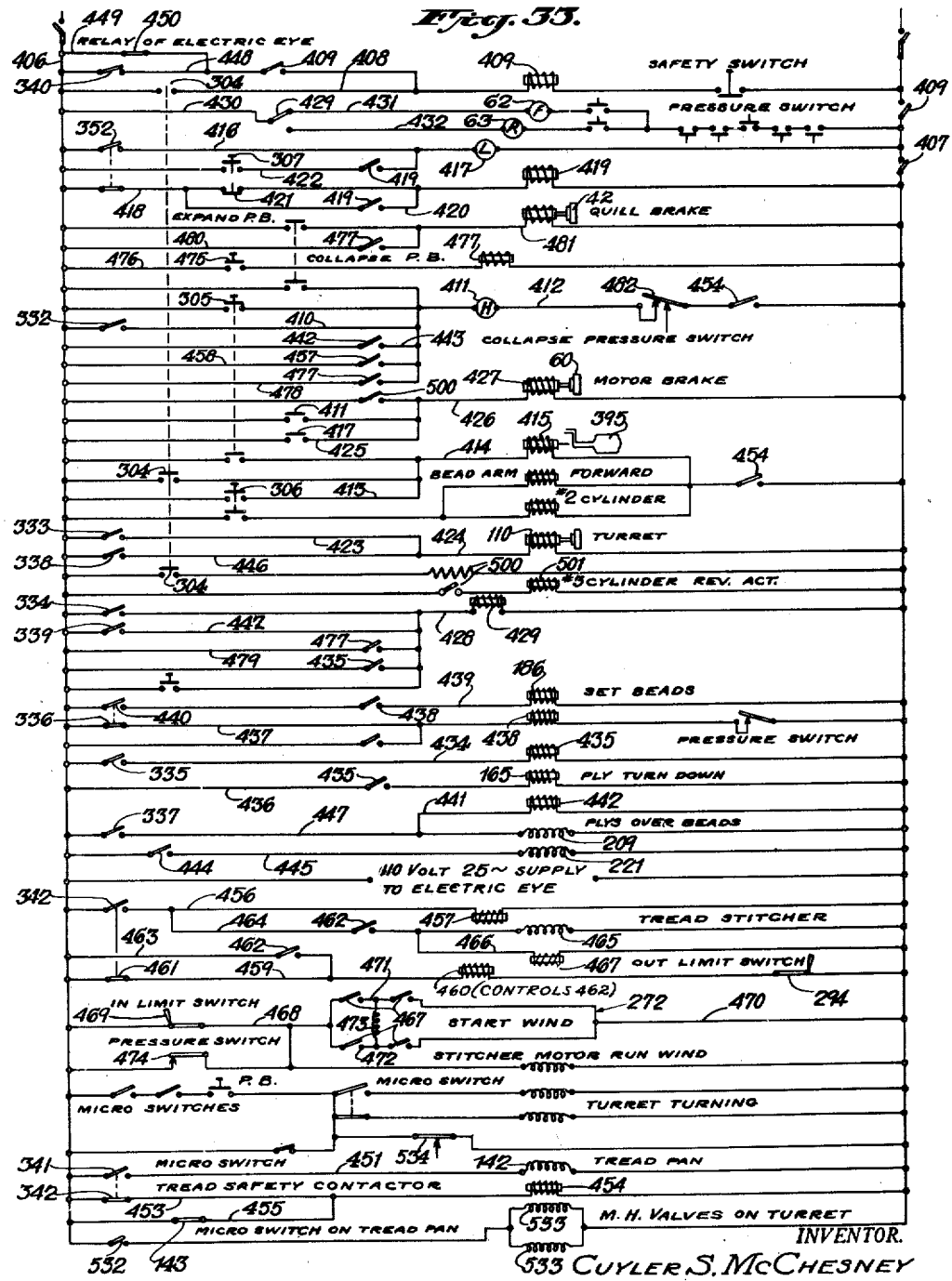

UNITED STATES PATENT OFFICE 2,394,464

TIRE BUILDING MACHINE

Cuyler S. McChesney, Kenmore, N. Y., assignor to Dunlop Tire and Rubber Corporation, Buffalo, N. Y., a corporation of New York Application October 3, 1942, Serial No. 460,705

48 Claims. (Cl. 154—10)

My present invention relates to a machine and method for building tires, particularly tires for motor vehicles. Tires are generally constructed of a number of layers or plies of cord fabric impregnated in rubber on which there is applied a breaker strip, chafer strips and finally a tread. The cords are bias or inclined to the circumference of the tire, generally at an angle of about 45 degrees, and with the inclination or angle of the successive layers alternately reversed so that they cross the cords of the immediately adjacent plies. These cords are secured at their edges in wire rings or "beads."

In order to obtain uniform balance and strength, it is desirable that each ply extend throughout the circumference of the tire and with a minimum overlap. Failure of the ends of the ply to meet would create a weakness, whereas too great an overlap would cause a local thickening and overweighting of the tire.

To secure a uniform distribution of weight about the axis of the tire it is desirable that the overlappings or junctures of the plies be so distributed as to counterbalance each other.

Heretofore tires have been built by wrapping successive plies of rubberized cord fabric by hand onto a flat drum. The operator started the wrapping at a leading corner, or advanced edge of the bias cut fabric, and continued until he had completed a circumference, then repeated the wrapping with a second ply, the drum rotating in the same direction using a ply having an opposite bias angle, until he had completed the wrapping of the required number of plies, meanwhile securing the beads at the edges of certain of the plies and turning these plies over the bead. Thereafter the breaker, chafer and tread plies were applied, the drum collapsed and the tire shaped in a suitable vulcanizing mold and vulcanized. This required a considerable number of hand operations and the uniformity and precision of the entire structure were dependent upon the skill and care of the operator.

My present invention provides a tire building machine in which the successive operations are automatically controlled and in which the rotation of the tire forming drum is accurately controlled for the positioning and application of plies in both directions of inclination and in which the various layers or plies of material are brought to a convenient position for application to the former.

Accordingly, the time required for building a tire is greatly reduced and the respective plies are positioned accurately on the former so as to obtain uniformity and precision in the strength and balance of the tire.

In my present invention a tire forming drum is mounted on a supporting shaft which is driven and automatically controlled to bring the drum to the proper position for the application of each successive ply and to rotate the drum in the proper direction one revolution for the application of the respective ply.

The forming drum is of any suitable collapsing type. In the preferred embodiment of the invention it is supported on a shaft which comprises an outer hollow shaft or quill and an inner shaft rotatably supported in the outer shaft or quill and driven by suitable power, such as a two-speed reversing electric motor. The inner shaft and the quill are each provided with an individual hydraulically operated brake, the motor and driving mechanism being mounted within a suitable housing from which the shaft projects and the forming drum being mounted on a projecting end of the shaft.

In starting the apparatus the inner shaft is driven forwardly by the motor while the quill is restrained from operation by its brake until the drum has expanded whereupon both the shaft and quill rotate together throughout all succeeding operations until the drum is to be collapsed.

At this point an end of a bias cut fabric is brought by a supply turret into position to be mounted or cemented to the surface of the forming drum and its leading corner is secured by the operator to one of the shoulders of the drum. The successive rotations of the drum are then controlled by a timing mechanism whereby the drum is now given one complete revolution and stopped. The ply stock is then torn or severed at the point of union within the leading edge, thus completing the application of the first ply. Thereupon the timer is actuated to reverse the rotation of the drum and stop it at a predetermined place. The second ply is then drawn from the turret supply and tacked to the first ply and the drum given a complete revolution whereby a second ply is placed on the first ply and with the angle of inclination of the cords reversed. Thereupon the second ply is torn or severed from the turret stock. The drum may then be rotated forwardly at a low speed and the two plies stitched together by suitable stitching rollers and the edges of the plies brought down over the ends of the drum. The plies are then in position to receive the beads.

The beads with the covering flipper strips are brought against the sides of the plies that have been turned downwardly against the end faces of the drum by means of bead rings which advance to the ends of the drum and press the beads onto the plies where they remain when the bead rings are removed. The plies are then turned over the beads and pressed down securely. For this purpose the drum is rotated at a high speed. Thereupon the succeeding plies are applied similarly, the drum being rotated to a predetermined starting position in each instance and then given one revolution in alternately reversed directions. When the required number of cord plies have thus been built up the breaker and chafer strips are added and finally the tread is applied. A tread stitcher is then brought into contact with the tread and the drum rapidly rotated while the stitching disks travel to the edges of the tread and are then automatically removed, then the drum is collapsed while holding the quill shaft with its brake and rotating the inner shaft in reverse.

At any point in the building of a tire the above sequences may be interrupted, the drum released from the motor and rotated by hand. Or it may be rotated at either low or high speed by the motor. It may then be placed in position to continue the sequence of operations at any desired point therein.

The above sequence of operations is provided by a suitable timer which controls successive electric switches to start and stop the motor at predetermined positions and to rotate it at predetermined speeds. These switches are operated successively by a traveling mechanism which advances step by step throughout the squence of operations.

The plies that are wound on the drum before the beads are applied, for example the first two plies, are wrapped about the beads and are, therefore, wider than the plies added after the beads are applied. To avoid having the edges of the plies in exactly superposed position, which would cause an abrupt edge, adjacent plies are shifted sidewise before being wound on the drum. This may be accomplished by a suitable sidewise shifting of the ply supply roll. Successive supply rolls may be brought to position for application to the drum by any suitable mechanism. Preferably a rotating turret is provided having opposite arms on one of which supply rolls may be filled with ply fabric while fabric is being drawn from the other.

Associated with this turret is also a supply mechanism for supplying the breaker, chafer strips and tread. Means are also provided for turning down the first two plies preparatory to applying the beads, and for turning these plies over and about the beads after the latter have been placed in position.

The various operations in the building of the tire are controlled and set in operation in sequence by electric circuits under control of a timer and of certain hand operated switches whereby each operation takes place automatically in its proper sequence.

The various features of the invention are illustrated, by way of example, in the accompanying drawings, in which Fig. 1 is a front elevation of a tire building machine embodying a preferred form of my invention;

Fig. 2 is a horizontal section taken through a part of the machine on line 2—2 of Fig. 1;

Fig. 3 is a vertical section through the motor housing taken lengthwise of the driving shaft of the tire building drum;

Figs. 4 and 5 are sections through the driving housing taken on the lines 4—4, 5—5 respectively of Fig. 3;

Figs. 6 and 7 are respectively a front elevation and plan of the tire building drum and supporting shaft;

Fig. 8 is an end view of a portion of the drum and stitcher mechanisms and of the delivery part of a supply turret;

Fig. 9 is a plan; Fig. 10 a side view and Fig. 11 an end view of the supply turret;

Fig. 12 is a horizontal section and Fig. 13 a vertical section of mechanism for rotating the supply turret;

Fig. 14 is a side elevation of a tread stitcher control mechanism;

Figs. 15 and 16 are vertical sections taken on the lines 15—15, 16—16 respectively of Fig. 14;

Fig. 17 is an elevation of tread stitching mechanism forming a part of the machine;

Fig. 18 is a plan view and Fig. 19 is a side view, partly in section, of a stitching mechanism for turning down the edge of plies over an end of the forming drum;

Fig. 20 is an end view, on a larger scale, of a turn-down disk showing the manner of turning over the plies;

Figs. 21 and 22 are sections for turnover disks;

Fig. 23 is a side view, on a somewhat larger scale, of an assembly of the turn-down disks;

Figs. 24 and 25 are respectively an end view and a front view or elevation of the drum and of a mechanism for turning plies over the beads on opposite ends of the drum;

Fig. 26 is a plan of a control mechanism, the covering being removed to show the elements of the controller;

Fig. 27 is a side elevation of the controller mechanism, the casing being shown in section and the view taken from the right of Fig. 26;

Figure 29:
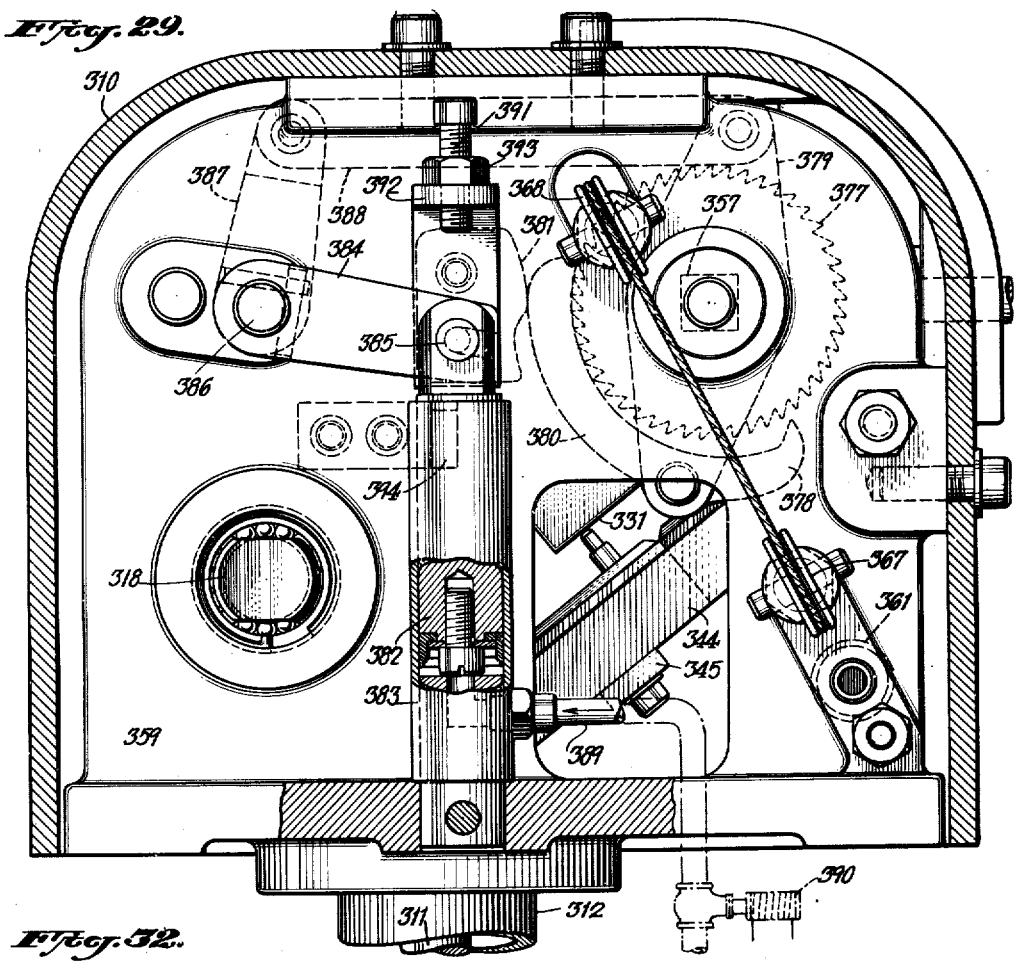
Figure 32:
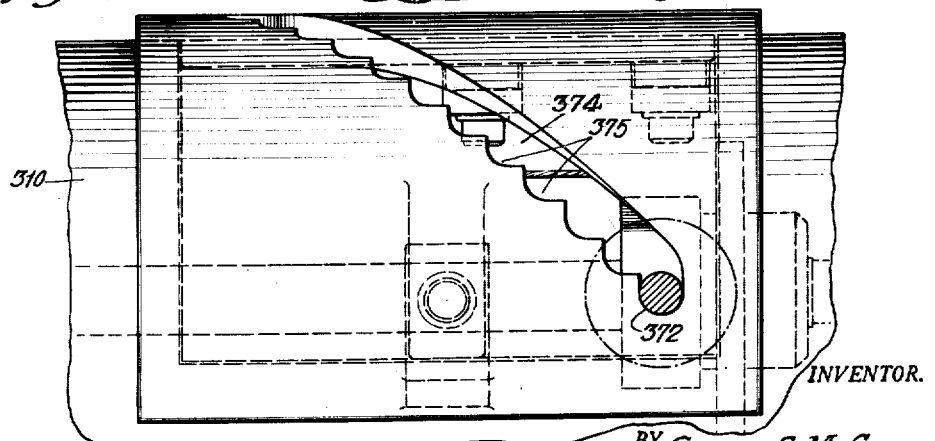

Figs. 28, 29 and 30 are respectively vertical sections taken on the lines 28—28, 29—29 and 30—30 respectively of Fig. 26;

Fig. 31 is a vertical section taken on the line 31—31 of Fig. 26;

Fig. 32 is a detail view in elevation of a control handle of the timer;

Fig. 33 is a wiring diagram of the controlling electric circuits, various relays being shown in different parts of the diagram from the switches controlled thereby but both having the same numbers in order to avoid complexity of crossing of the electric circuits in the diagram;

Fig. 34 is a longitudinal section through one end of a supply roll; and

Fig. 35 is a cross-section of a bearing of this roll taken on line 35—35 of Fig. 34.

In the drawings, the mechanism has for simplicity, been described as applied to the making of a 4-ply tire or tire casing, this being a common type of tire, but it will be understood that it can be used for a 6-ply fabric or other multiply fabric by suitable modifications in the timer, turret and electric circuits.

Former drum drive

Referring more particularly to Figs. 1 to 6 of the accompanying drawings, a collapsible tire forming drum 35 is mounted on the ends of an assembly of an inner shaft 36 and outer shaft or quill 37 projecting from a motor housing 38.

The drum or former 35 is mounted on the projecting end of the shaft assembly 36, 37 in such a manner that when the inner shaft 36 rotates in one direction relative to the quill 37, the drum 35 is expanded to a cylindrical shape, and when rotated in a reverse direction the drum collapses to permit the removal of a tire structure formed on the drum.

The collapsing mechanism may be any of the standard known forms, and as it forms no part of the present invention it is not illustrated in the drawings.

The quill 37 extends for a short distance inside of the housing 38, Fig. 3, and is journalled in a wall of the housing by means of a bearing as, for example, the anti-friction or ball bearing 39, Fig. 3, the outer race of which is mounted in a retainer ring 40 bolted to the wall of the housing 38 through which the quill 37 and shaft 36 project. The retainer ring 40 also extends inwardly to form a supporting bracket 41 for the stationary part of a hydraulic brake, the drum 42 of the brake being bolted or otherwise secured to the end of the quill 37 so that the quill may be stopped from rotation independently of the rotation of the shaft 36.

The shaft 36 extends through the quill 37 within the housing 38 and is rotatably supported within the quill by means of a roller or pin bearing 43. The other end of the shaft 36 is rotatably mounted in an anti-friction or ball bearing 44 mounted in a retainer ring 45 which is in turn bolted to the opposite wall of the housing 38.

It will be understood that the inner shaft 36 is supported in the bearings 44 and 43—39 and that the quill 37 is journalled in the bearing 39 and supported by the inner shaft 36 with which it generally rotates as a unit except when the drum is to be expanded or collapsed.

The retainer ring 45 also has an inward extension onto which is secured the base 46 for the stationary hydraulically operated shoes of a brake mechanism.

The shaft 36 is rotated by a two-speed reversing electric motor 47 mounted in the lower part of the housing 38 through a transmission mechanism comprising a small pulley 48 on a projecting end of the motor shaft, a large pulley 49 secured on the shaft 36 by means of a tapered wedging split ring 50 and connecting belts 51 trained about the respective pulleys 48 and 49.

The pulley 49 has inclined vanes 52 to act as fan blades to circulate air through openings or louvers 53 in the housing 38. The pulley 49 also supports a rotating brake drum 54 whereby the shaft may be promptly stopped by the application of hydraulically operated brake shoes.

The braking mechanism for the shaft 36 may be substantially identical with that for the quill 37 and comprises a pair of brake shoes 55 and 56, Fig. 5, pivotally supported on the ends of swinging arms 57 and 58 which are in turn pivoted on a bolt 59 on the supporting bracket 41, and at the upper ends may be expanded or pressed apart by a suitably controlled hydraulic cylinder 60 and pistons engaging the upper ends of the brake shoes. The braking shoes are withdrawn from braking or contacting position by means of tension springs 61. It will be understood that any suitable type of quick acting brake may be employed.

When the motor is rotated in one direction or the other it drives the shaft 36 and with it the quill 37 to rotate the drum in a corresponding direction and at a corresponding speed. The shaft and quill may be stopped instantly by the hydraulic brake 54 in any predetermined or selected position and either of the brake drums 42 or 54 may be stopped independently to provide a relative rotation of quill and shaft for the purpose of collapsing or expanding the drum 35. The housing 38 is mounted on a base 62 which extends beneath the drum 35 forming a rigid support not only for the housing 38 but for mechanisms cooperating with drum 35 in building the tire.

The motor 47 is reversible through appropriate forward and reverse switches 62 and 63 respectively in a control circuit shown diagrammatically in Fig. 33 and is a two-speed motor controlled alternatively by a high speed control and low speed control in said control circuit.

*Supply turret*

In building a tire the drum 35 is rotated in a forward direction while a single layer of bias fabric is wrapped around it to form a ply, then rotated in reverse while a second layer is wrapped to form a second ply with a reversed bias angle and thereafter successive wrappings applied with alternate reversals until the required number of plies have been built up. The breaker and chafer and tread strips are then applied. These plies and strips are brought to position for application to the drum in timed sequence by a feeding turret on which a supply of fabric for each ply, chafer and breaker strips and tread are mounted and swung into proper position in timed relation to the tire building machine.

A preferred form of turret and its position relative to the tire building machine is shown in Figs. 8–13 inclusive.

As shown more particularly in Figs. 8, 9 and 10, the plies are carried on a horizontal table 66 carried on the upper end of a vertical shaft or pillar 67 rotatably supported on a base 68. The table 66 comprises two triangular frames 69 and 70 mounted on the top of the pillar 67 in symmetrical position and each comprising shorter straight beams 71 and 72 and, at an angle, longer beams 73 and 74, each having an extension 75 parallel to its beam 71 or 72.

Between the beams 71 and 72 and the parallel extensions 75 of the beams 73 and 74 there are mounted two sets of bias fabric supply mechanisms. The upper set each comprises a pair of side plates 76 and 77 slidably secured between the extensions 75, the beams 71 and 73 respectively, and between these side plates is mounted a supply roll 78 having wrapped thereon the bias cut fabric 79 and a liner of fabric to which the rubberized bias cut fabric will not adhere.

As the bias fabric is drawn from the supply roll 78 the liner will pass from the roll 78 and be wrapped onto a roll 80 supported on swing arms 81 and pressed against the roll 78 by a spring mechanism 82, Fig. 8. As the roller 80 is rotated the liner is wrapped about it while the bias cut fabric 79 passes down onto a feeding table 83 which is pivotally supported at its upper end between the plates 76 and 77 so that it may be swung from the operative position, shown at the right of Fig. 10, upwardly to the inoperative position, shown at the left thereof. The plates 76 and 77 and the rolls and feeding table may be shifted sidewise as a unit by means of pneumatic pistons and cylinders 84 secured to the beams 71 or 72 and extensions 75 by brackets and thus serve to shift the bias fabric supplied to the drum. Admission of air to and from the cylinder is controlled by an electromagnetic valve 85.

Tension springs 86 tensioned between pins 87 on opposite sides of the table 83 and pins on the supports 76 and 77 serve to hold the table in its upper or lower position by passing over a neutral or dead center in swinging from one position to the other.

On each table 83 there are mounted a pair of spaced guides 88 and 89 which may be positioned to guide the bias cut fabric into proper position for application to the forming drum 35, as shown at the left in Fig. 9. Transverse slots 90 and 91 are provided in the table through which securing studs of the guides pass to permit sidewise adjustment according to the width of the ply.

When a ply, as for example, the first and second plies are to be applied to the forming drum 35, the table 83 is lowered to the position shown at the right in Fig. 10, while it is at the left and immediately above the forming drum 35, and the fabric as it is wrapped on the forming drum is drawn over the table and between the guides 88 and 89.

When the drum has completed one full revolution the bias cut fabric is torn loose leaving two cords to overlap and thereupon to be spliced by the stitching rollers. The unused part is then turned back onto the table 83.

The third and fourth plies are supplied from a lower feed supply similar to that of the upper, having a supply roll 92 supported between two side plates 93 and 94 slidably mounted between the beams 71 or 72 and 73 or 74. A roller 95 swings on arms 96 and is pressed by a spring mechanism 97 against the roll 92. The supply being drawn from the supply roll 92 passes between the rolls 92 and 95 and the liner is rolled on the roll 95 while the ply fabric passes to a table 98 pivoted at its upper end between the supports 93 and 94. The plates 93 and 94, rolls 92 and 95 and table 98 are shifted by means of pneumatic pistons and cylinders 99, similar to the pistons and cylinders 84, and secured to the beams 71, 72, 73 and 74 respectively.

The lower table is also held in upper or lower position, shown at the left and right of Fig. 10, by means of springs 100 confined between the pins 101 on the support and pins 102 on the table to pass over a dead center in moving from upper to lower position or vice versa. The lower table 98 is also provided with guides, not shown, similar to those of the upper table 83.

At the lower end of the table there is mounted a rotatable roll 103 about which the bias cut fabric may pass to the drum 35 from either table, when the drum is rotated in reverse, so that as the forming drum is rotated one revolution in reverse the bias cut fabric is applied with the cords inclined oppositely from those of the plies applied in forward rotation.

It will be understood that the feed tables and supply rolls are shifted sidewise in one direction or the other after each ply is drawn therefrom. Inasmuch as the supply mechanisms and opposite sides of the table are identical only one of them is described and the same reference numerals are applied to each.

The rolls 78 and 92 contain enough ply fabric for a definite number of tires, for example, six tires. When the supply rolls are exhausted the turret is rotated 180° to bring a new supply of rolls into position to be applied to the drum 35 and the exhausted rolls into position to be replenished.

For this purpose, the rotatable pillar 67 is rotated 180° about its axis by means of a rack 104 and a pinion 105 keyed on the shaft 67, as shown in Figs. 12 and 13. The rack 104 is connected at its opposite ends to and reciprocated by a pair of fluid actuated pistons 106 and 107 in respective cylinders 108 and 109. Fluid under pressure is alternately admitted to and exhausted from the opposite ends of the cylinders 108 and 109 through an electromagnetically controlled valve 110 shown diagrammatically in Figs. 12 and 33. With each alternate shifting of the pistons 106 and 107 and rack 104 the pinion 105 and shaft 67, to which it is keyed, are rotated alternately 180° in opposite directions.

The pillar 67 may be mounted on the base 68 by means of an upper frictionless thrust bearing 111 and a lower friction or ball-bearing 112 and is retained in position by means of a retaining ring 113 at its lower end. This enables the pillar to be freely rotated in opposite directions.

The chafer strips, breaker strip and tread are supplied to the drum from a stationary table 114, Figs. 8–11, extending at right angles to the axis of the forming drum and approximately aligned with the center circumferential line of the drum and, therefore, at one side of the pillar or post 67.

The table 114 comprises a pair of parallel spaced horizontal lower rails 115 and 116 in which are journalled a series of parallel spaced rolls 117 on which the breaker and chafer strips are placed to extend longitudinally toward the drum 35, the breaker strip extending along the center line of the row of rollers and there being a chafer strip on each side and extending to the drum in position to be wrapped onto the marginal edges of the assembled tire carcass immediately over the bead.

At the end of the table nearest the drum are three rollers 118 of larger diameter. The breaker and chafer strips extend over these rollers and thence onto a sliding table 119 spaced somewhat above the rollers. The table 119 comprises a pair of side arms 120 and 121 between which is journalled a lead-in roller 122 and then a flat pan 123 which extends to within a short distance of the surface of the drum 35.

At the forward end of the table 119 there is mounted a small roller 124 slightly above the level of the pan 123 underneath which the front ends of the breaker and chafer strips pass. The pan 123 is provided with three parallel sets or pairs of guides 125, for the tread and the chafer strips. The lead end roller 118 is preferably made in a number of sections so that the breaker and chafer strips may move at independent speeds onto and over the pan.

The front end of the pan or table is turned down as at 126 to permit the breaker and chafer strips to pass readily to the drum. In applying the breaker and chafer strips the drum is rotated forwardly one revolution, drawing the breaker and chafer strips into the proper position. Afterwards they may be stitched onto the plies and thereafter the tread is applied.

The tread is carried on a series of rollers 127 spaced above the breaker and chafer strips carrying rollers 117 and mounted on a pair of rails 128 and 129 which are slidable lengthwise of the table. The side rails 128 and 129 are connected together by cross-beams 130, three being shown by way of example in the accompanying drawings.

While the cord plies, breaker and chafer strips are being applied the assembly of side rails 128 and 129 and rollers 127 on which the tread rests is in the position shown in Fig. 10. When the tread is to be applied to the forming drum 35 the side rails and rolls are moved lengthwise to a position at which the lead-end roller is in position immediately adjacent the assembled tire carcass on the drum.

As shown in Fig. 10 this forward movement is accomplished by means of a fluid operated cylinder 131, pivotally connected at 132 to a cross-beam 133 of the table, and a piston having a stem connected at its forward or free end to a depending bracket 134 on the middle cross-arm 130. When fluid under pressure is admitted to the right-hand end of the cylinder 131 it serves to slide the series of rollers 127 toward the drum, leaving the advanced end of the tread in position to be applied to the upper surface of the plies, breaker and chafer strips.

The tread is guided on the rollers 127 between a pair of spaced guides 135 and 136 which are adjustably secured to cross-bars 137 to permit these guides to be adjusted to the width of the tread. At the front or advancing end of the table 114, a pair of guide discs 138 and 139 are mounted on brackets 140 and 141 or rods extending through uprights in the table so that the spacing or distance apart of these discs may be adjusted to the dimensions of the tread.

When the tread has been applied and spliced, rollers 127 are then retracted by admitting fluid pressure to the opposite end of the cylinder 131. The admission of fluid to the cylinder 131 is controlled by an electromagnetic valve 142, Figs. 10 and 33.

To prevent the motor from running at high speed until the tread is entirely removed from the tread pan a safety switch 143, which may be a micro switch is provided with an actuating lever depressed by the tread to open the high speed circuit of the motor 47, Figs. 8–11, 33.

*Bead rings and ply turnover*

After the two plies have been applied to the forming drum and stitched together by a hand operated stitcher, not shown, they form a cylinder as indicated at 144, Fig. 6, with the ends projecting beyond the edges.

Before the third and fourth plies are applied the projecting ends of the plies 144 are turned inwardly flat against the face of the drum 145 and beads applied, after which the margin beyond the beads is then turned reversely outwardly to enclose the beads and to contact with the outer face of the plies 144. Thereafter the third and fourth plies may be applied.

The plies 144 are turned inwardly against the ends of the drum while the forming drum is rotating at a slow speed. It may be done by hand but preferably by the mechanism 146 and 147 shown in Figs. 18–23 inclusive; one of each such mechanisms being provided at each end of the drum as shown in Figs. 1 and 6.

Each of these mechanisms comprises a pneumatic cylinder 148, Figs. 18 and 19 mounted on a common shaft 149 which is in turn supported by brackets 150 extending upwardly from the base 62. Each of the cylinders 148 has an extension 151 through which the shaft 149 passes and which is secured to the shaft by means of a set screw 152.

Within the cylinder 148 is a piston 153 having a stem 154 extending over the extension 151 and carrying at its projecting end a cross-plate 155 on which is mounted a bracket 156 carrying an assembly of turnover disks 157, 158, 159, 160. The cross-plate 155 is guided in movements of reciprocation by a pair of guide rods 161 and 162 that extend through spaced guides 163 and 164 respectively.

When the projecting edges of the plies are to be turned down against the face of the drum, air, under pressure, is admitted through an electromagnetic valve 165 and a supply pipe 166, Figs. 8 and 33, to the lower end of the cylinder 148 and exhausted from the upper end of the cylinder through a pipe 167 and the valve 165 forcing the stem 154 outwardly and thus forcing the disk-carrying heads 156 and disks 157—160 outwardly against the surface of the drum. When the turnover disks are to be withdrawn pressure fluid is admitted to the opposite end of the cylinder through valve 165 and pipes 166 and 167.

The disks 157 and 159 consist of double disks, or a pair of spaced disks, as shown particularly in Fig. 21, and the disk 158 is a single disk fitting in the spaces or grooves of the disks 157 and 159 so as to form a substantially continuous face to press the plies progressively inwardly toward the flat end faces and finally the disk 160 presses the plies tightly against the end faces of the drum, as shown more particularly in Fig. 20.

When the plies have been pressed against the ends of the drum 35, the heads 156 and disks 157—160 are withdrawn, leaving the surface of the plies free to receive the beads.

The beads are mounted on "bead rings" 169 and 170, Figs. 1, 6 and 7. The bead rings 169 and 170 have annular flanges 171 and 172 respectively, projecting toward the drum 35 and each has a groove 173 at its outer peripheral edge or corner to receive its respective bead. The rings are supported on spiders 174 and 175 which are in turn mounted on the upper ends of supporting brackets 176 and 177. Each of these brackets is slidably mounted on supporting rails or shafts whereby they may be moved toward and from the drum 35.

The bracket 177 is in fixed position relative to the axis of the drum 35 so as to hold the flange 172 and groove 173 centered co-axially with the drum. The lower part of the bracket 177 is widened to an integral base 178 through which pass supporting rods or shafts 179 and 180. For convenience these rods may be positioned slightly back of the vertical plane of the axis of the drum 35 and are preferably in a horizontal plane.

The rod 179, which is hollow, is supported on and between a standard 181 and the wall of the housing 38, Figs. 1, 2, 6 and 8. It is, or may be, a non-rotating rod rigidly secured in its supports.

The rod 180 is longer than rod 179 and extends from within the motor housing 38 through an intermediate standard 182 to an end standard 183 extending upwardly from near the opposite end of the base 62.

Figure 4:
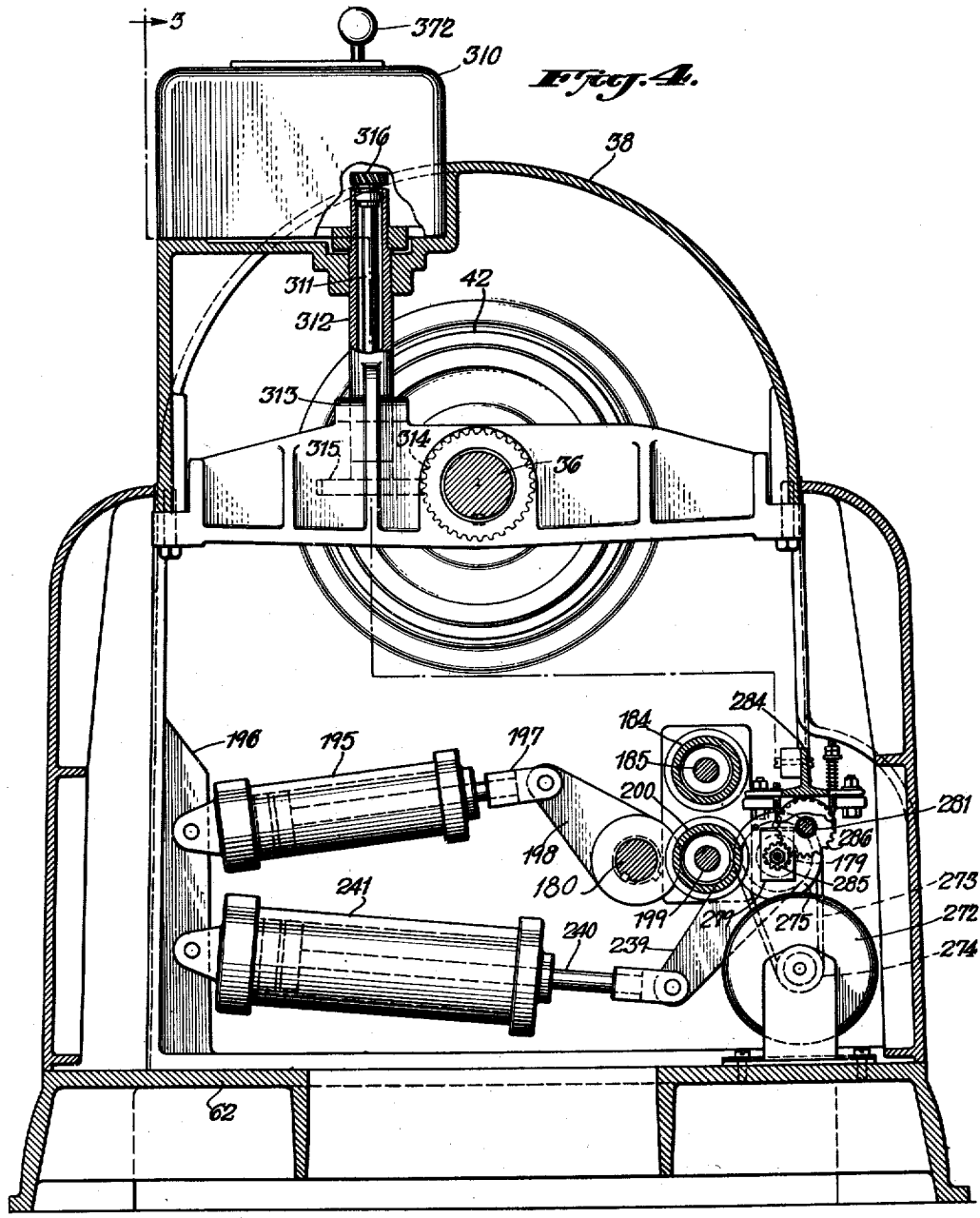

The arm 177 and its base 178 are slidable longitudinally on the rods 179 and 180 and are actuated by a pneumatically or hydraulically operated piston and cylinder 184 to which the arm 177 is connected by a sliding piston rod 185, Figs. 1, 2 and 4.

The bead ring 170 is supplied with a bead before the plies of fabric are wrapped on the drum and while the drum is collapsed.

When the bead is to be applied to the drum, fluid is admitted through an electromagnetic valve 186, Figs. 2 and 33, to the right of the cylinder 184 to drive the piston and piston rod 185 to the left and bring the bead ring 170 tightly against the end of the drum 35 and then, reversely, to the left end of the cylinder to move the arm 177 away from the drum.

The arm 176 is pivotally supported so that it may swing into co-axial position relative to the drum 35 and out of co-axial position a sufficient distance to permit a completed carcass or tire to be removed longitudinally from the drum when the latter is collapsed. For this purpose the arm 176 is keyed at its lower end on a shaft 187, Fig. 8, which is pivotally supported at its ends between a pair of ears 188 extending upwardly from a base 189. To accurately position the arm 176 with the ring 171 centered on the axis of the drum 35 the lower part of the arm 176 is provided with a side extension 190 which, as shown in Fig. 8, rests on a flat support 191 of the base 189 when the arm is moved to co-axial position.

The base 189 is slidably supported on the rod or shaft 180 and a parallel shaft 192, Figs. 2, 7 and 8, which is supported between the standard 183 and the standard 182. The arm 176 is rocked to and from its co-axial position by means of a pinion 193 keyed on the rock shaft 187, and made fast to the arm 176, and meshing with a gear or half gear 194 slidably mounted on the shaft 180 with a sliding key to permit the base 189 and arm 176 to slide longitudinally of the shaft. To fix and secure the gears 193 and 194 in proper engagement or mesh, the lower end of the arm 176 is bifurcated to receive the pinion 193 and the sliding base 189 is bifurcated to receive the gear 194.

When a bead is to be applied to the assembled plies on the drum it may be mounted in the groove 173 of the bead ring 171 while the latter is tilted out of alignment with the axis of the drum 35. To apply it to the tire structure built up on the drum the shaft 180 is rocked to swing the arm forwardly or clockwise, as viewed in Fig. 8, until the projection 190 rests upon the flat support 191 of the base 189 and is thus in alignment or co-axial with the drum 35.

The shaft 180 is rocked by means of a pneumatic or hydraulically operated piston and cylinder 195, Figs. 2, 4 and 5, pivotally mounted at one end on a supporting rib 196 of the housing 38 and reciprocating a piston stem 197 articulated to the free end of a lever 198 keyed onto the inner end of the shaft 180.

When pressure fluid is admitted to the outer end of the cylinder 195 it rocks the arm 198 and shaft 180 clockwise, when viewed as in Figs. 5 and 8, or counterclockwise, when viewed in the opposite direction as in Fig. 4, and swings the arm 176 out of position of alignment with the drum 35. Conversely, when fluid is admitted to the opposite, or pivoted, end of the cylinder 195, the arm 176 is swung over counterclockwise until projection 190 rests on the flat surface 191, whereupon the base 189 may slide lengthwise of the shafts 180 and 192 to bring the bead ring tightly against the end of the drum 35. For this purpose the base or carriage 189 is secured to a piston stem 199, Figs. 1, 2 and 7, which extends through the wall of the housing 38 and into a cylinder 200 mounted immediately beneath the cylinder 184.

The end of the piston rod 199 in the cylinder 200 is provided with a piston similar to that of piston rod 185 so that when pressure fluid is admitted to the left of cylinder 200 the bead ring will be moved into engagement with the drum 35, and when pressure fluid is admitted to the opposite end of the cylinder 200 the bead ring will be pushed away from the drum 35 and then may be tilted to one side.

After the bead has been applied that part of the ply extending beyond the bead is turned up, around and over the bead to entirely enclose it. This may be accomplished manually by lifting that part of the ply lying along the end surface 145, or by a special mechanism as shown particularly in Figs. 24 and 25.

In this mechanism a pair of cone shaped discs are rotatably mounted and slidable on a bracket pivotally mounted on the shaft 180 so that they may be swung from a position below the drum 35 upwardly to face the end surfaces 145 of the drum 35 and then moved axially into contact therewith. Thereafter the bracket is tilted outwardly on its supporting lever to cause the edge of one of the cone shaped discs to pass between the end face of the drum and the turned down edges of the plies and thereby as the drum and disc rotate progressively turn the plies outwardly away from this surface. This disc progresses outwardly until it reaches the bead against which it is pressed by spring pressure.

A second disk, supported at a distance from the end surface of the drum equal to the thickness of the bead and turned over ply, then passes outwardly further turning the ply about the bead to encircle it. The turned over end of the ply may then be pressed against the outer surface of the plies beyond the bead ring. The gradual turning of the plies about the bead surface holds it in position against displacement, the bead adhering with considerable tenacity to the plies during this step.

In Figs. 24 and 25 the lever, for supporting the disk-carrying brackets, comprises a pair of arms 201 and 202 pivotally mounted at one end on the shaft 180 and secured together by an integral rod or brace 203 so as to rotate as a unit. These arms may be bent or curved toward each other near their pivoted ends so as to fit against the standards 181 and 182 and thus be placed in fixed axial position to the drum 35.

Spanning the arms 201 and 202, in spaced parallel relation near the free ends thereof, are a pair of longitudinally extending shafts 204 and 205.

The lever 201—202 may be swung upwardly about the shaft 180, on which it pivots, by means of a fluid operated piston and cylinder 206 pivotally supported at its lower end on a bracket 207 on the base and having a piston rod connected to a cross shaft 208 spanning the lever arms 201 and 202 at a short distance from the shaft 180.

Fluid may be admitted to and exhausted from the cylinder 206 by means of a magnetically controlled valve 209, Figs. 25 and 33. When fluid is admitted to the lower end of the cylinder 206 it forces the piston upwardly and tilts the lever assembly upwardly from the position shown in full lines in Fig. 24 to that shown in broken lines.

Slidably mounted on the shafts 204 and 205 are a pair of triangular brackets 210 and 211. These brackets may be separated beyond the planes of the end surfaces of the drum 35 and are thus separated when in the lowermost position. Mounted on the apex of each of the brackets 210 and 211 respectively, are rotatably supported turnover discs 212 or 213 respectively, and a rock lever 214 or 215 respectively. Mounted on the free ends of the rock levers 214 and 215 respectively, are cone shaped discs 216 and 217 projecting toward each other and with their flat faces opposed. The rock arms 214 and 215 are each resiliently held in a lowered position against stops 218 by means of springs 219 tensioned between ears 220 on the ends of the triangular brackets 210 and 211 respectively, and on the rock arms 214 and 215.

When these brackets are spaced apart, as shown in Fig. 25, and the assembly of brackets and levers 201—202 is tilted upwardly to the position shown in broken lines in Fig. 24, the discs 212 and 216 will be spaced from one end face of the drum 35 and within the perimeter of the edge of the turnover ply and, similarly, the discs 213 and 217 will be spaced from the opposite end face of the drum and within the perimeter of the turnover plies and bead. In this position the brackets 210 and 211, with their respective discs, are moved toward each other by means of a piston and cylinder 218′ mounted on the bracket 211 between the shafts 204 and 205, being bolted to the bracket 211, for example, and having a piston rod 219′ extending to, and secured to, the bracket 210 by means of a clevis or bifurcated end 220′.

Upon admitting fluid through a suitable electromagnetically controlled valve 221 to the left-hand end of the cylinder 218′, the piston and its rod 219′ are shifted to the right, sliding the bracket 210 until it reaches a stop 221′ on the shaft 205 and the discs 212 and 216 are brought in line with the end surface of the drum 35, whereupon further admission of fluid causes the bracket 211 to move to the left until it reaches a stop 222′ on the shaft 205 and its discs 213 and 217 are brought in line with the opposite end surface of the drum. The drum is then rotated while the bracket and supporting arm assembly swings downwardly.

As the disks 216 and 217 reach the inner edge of the turned over ply they rotate and the edge of the disk passes between the end surface of the drum and the plies forcing the plies outwardly along the conical surfaces of the disk. As the disks move outwardly gradually and the plies are thus turned over progressively with the rapid rotation of the drum, they do not displace the beads but rather anchor them the more securely by the outward turning of the margins of the plies.

When the disks 216 and 217 are brought up against the inner circumferences of the beads and are stopped, further lowering of the assembly causes the arms 214 to tilt, stretching the spring 219 and causes the second turnover disks or rollers 212 and 213 to move outwardly over the bead and turned over ply.

These rollers or disks have flat surfaces 222—223 spaced from the ends of the drums, by means of stubs 224 and 225, a distance equal to the combined thickness of the turned over plies and bead so that the turned over ply is thus pressed tightly about the bead as well as given a reverse turn. The remaining marginal end may then be readily pressed into contact with the outer surface of the plies between the beads.

Thereafter the lever 201—202 is lifted to position shown in dotted lines Fig. 24, fluid exhausted from the left end from the cylinder 218′ and admitted to the right end thereof to separate the brackets 210 and 211 to the distances they occupy in Fig. 25; whereupon the fluid may be exhausted from the lower end of the cylinder 206 and the mechanism assume its original position. The final plies may then be applied, overlapping the turned over lower plies.

*Tread stitchers*

When all the plies of bias cut fabric have been applied and stitched by the usual stitcher, which for simplicity is not illustrated in the accompanying drawings inasmuch as it may be a standard piece of equipment, the breaker and chafer strips and tread are applied. The tread is stitched onto the assembled plies by means of an automatic tread stitcher shown in Figs. 3, 4, 5, 6, 7, 8, 14, 15, 16 and 17.

The automatic tread stitcher comprises a pair of rollers or disks 226 and 227 having hubs 228 and 229 slidably mounted on a hollow supporting shaft 230 which is mounted at its ends in a suitable bracket 231, Fig. 17. The bracket 231 comprises an arm 232 keyed onto the shaft 179 overhanging the standard 181 and has a pair of branches 233 and 234 extending parallel with the surface of the drum and then turned at right angles to form the supporting ends or heads 235 and 236 for the hollow shaft 230. The shaft 179 is a hollow rock shaft journalled in a suitable bearing 237 in the standard 181 and in a bearing 238 in the wall of the housing 38.

Within the housing 38 an arm 239 is rigidly secured or keyed to the shaft 179 and its free end is connected, as shown in Figs. 4 and 5, to the end of a piston stem 240 extending into a pneumatically operated cylinder 241 which is pivoted to the rib 196 below the cylinder 195.

When actuating fluid under pressure is admitted to the left end of the piston, as shown in Fig. 4, or at the right-hand, as shown in Fig. 5, forcing the piston rod 240 out of the cylinder, it rocks the shaft 179 clockwise, as viewed in Fig. 5, and thus brings the edges of the stitcher disks 226 and 227 into contact with the edge of the tread.

Contact with the tread causes the stitcher discs to rotate on the shaft 230 with a pressure that is controlled by the pressure fluid admitted to the cylinder 241. The discs 226 and 227 are movable longitudinally on the shaft 230 and in order to enable them to follow the contour of the tread the arm 232 of the bracket 231 is made in two parts, a lower part 242 being keyed directly to the shaft 179, and an upper part 243 carrying the arms 233 and 234, being secured to a pivot pin 244 by means of a screw 245, or other suitable means, which extends into a suitable recess in the lower part 242 and is rotatably locked therein by a pin 246 engaging a recess 247 in the pivot pin 244. In this way the upper branched part is secured to the lower supporting part or stump 242 to permit the branches 233 and 234 to tilt, this tilting of the branches on the axis of the pin 244 being limited by any suitable means, not shown.

The discs 226 and 227 are substantially in contact face to face and at about the mid line of the forming drum as they are brought in contact with the latter. They are then caused to separate to a predetermined distance while rotating in contact with the surface of the tread and upon further rotation are brought together after they have been tilted out of contact with the tread.

The discs 226 and 227 are moved longitudinally on the shaft 230 by means of a screw shaft 248 extending lengthwise within the hollow shaft 230 and rotatably mounted in bearings 249 and 250 in the heads 235 and 236 of the bracket. The screw shaft 248 has left-hand and right-hand screw threads 251 and 252 extending from its mid point. On the screw threads 251 and 252 are mounted a pair of nuts 253 and 254 which are held from rotation by means of projections 255 and 256 which extend through a longitudinal slot 257, Fig. 17, in the shaft 230 and enter inner annular grooves 258 and 259 of the hubs 228 and 229.

When the shaft 248 is rotated in one direction the nuts 253 and 254 are pushed in opposite directions from the mid point of the screw and the projections 255 and 256 will carry the respective stitcher discs 226 and 227 while permitting these discs to rotate. The screw shaft 248 extends through the end of the bracket 235 and carries a sprocket 260 keyed onto the projecting end of the screw shaft and connected by means of a chain 261, Figs. 8 and 17, to a sprocket 262 keyed to the end of a shaft 263 mounted in a suitable bearing 264 in an ear 265 on the bracket branch 233.

The sprockets 260, 262 and the chain 261 are covered by a suitable cover 266. The opposite end of the shaft 263 is mounted in a suitable bearing 267 on the part 243 of the bracket 231. The shaft 263 is connected through a train of gears 268, 269 and 270 to a drive shaft 271 journalled in and extending through the rock shaft 179 into the housing 38. The shaft 271 is driven from an individual motor 272 within the housing 38, Fig. 14, through a belt 273 connecting the pulley 274 of the motor to a pulley 275 rotatably mounted on an anti-friction bearing 276 on the projecting end of the shaft 271 and from the pulley 275 to the shaft 271 through an overload release device. This overload release comprises a pin 277 projecting sidewise from the pulley 275 providing a driving lug against which the spring loaded plunger 278 comes in contact. A spring loaded plunger 278 is secured in a guide 279 which is keyed on the shaft 271.

When the resistance to rotation of the shaft 271 exceeds a certain limit the pointed end of the plunger 278 will be forced inwardly against the pressure of its spring and the pulley 275 will then rotate without rotating the shaft 271.

The shaft 271 also drives a limiting device for limiting the travel of the stitcher disks 226 and 227. This limiting device comprises a screw threaded shaft 281 mounted in bearings 282 and 283 suspended at spaced intervals from a cross-beam 284.

The shaft 281 is driven from the shaft 271 through a pinion 285 keyed to the shaft 271 and meshing with a gear 286 keyed or pinned on the screw shaft 281. The shaft 281 is thereby rotated in fixed relation to the shaft 271. A nut 287 is threaded on the shaft 281 and is provided with a groove 288 in its upper edge which receives a guide bar 289 secured to the lower surface of the cross-beam 284 to prevent the nut from rotating. As the shaft 281 is rotated in one direction or the other, the nut 287 moves in a corresponding direction lengthwise of the shaft 281.

The nut 287 is provided with a sidewise extending cam 290, as shown particularly in Figs. 14 and 15, which engages and lifts a lever arm 291 of a limiting switch 292 or a lever 293 of a limit switch 294.

When the motor 272 is to be started the nut 287 will be below one of the levers 291 or 293, depending upon the direction in which the disks 226 and 227 and, correspondingly, the shaft 281 is to rotate.

As the disks 226 and 227 and shaft 281 rotate the nut 287 is threaded forwardly on the shaft 281 until it contacts with and lifts the other of the levers 291 and 293, whereupon the corresponding switch acts to reverse the motor 272, and accordingly the nut 287 threads its way back to its original position and, lifting the corresponding switch lever, opens the circuit contact to the motor 272 which thereupon stops.

In order to prevent the shaft 281 from overriding its position a suitable resistance to rotation may be provided by means of a brake drum 295 keyed on the shaft 281 and engaged by a flexible brake band 296 secured at one end on the cross beam 284 and at the other end to a rod 297 which is resiliently pressed upwardly by means of a spring 298 confined between the beam 284 and retaining nut 299.

The switches 292 and 294 are mounted on blocks 300 and 301 which are slidably mounted on an upwardly projecting web 302 of the beam 284 and may be secured in any desired position by means of a set screw 303. The switches may thereby be adjusted to provide any desired interval between the starting and stopping of the motor 272 and the stitching disks 226 and 227.

*Timer and control mechanism*

The successive steps in building a tire are set into operation and controlled by the action of a timer or control device driven by the drive shaft of the drum and by hand or foot operated levers in such a manner that the timer determines whether and to what extent an operation set in action by the manual control means shall take place. The tire building elements are electrically controlled by circuits that are opened or closed by switches operated from the timer in association with the manually controlled switches. As each step of the building of the tire is completed the timer indexes, or is indexed by a manually controlled means, to set the next step into operation or to permit it to be set in operation.

In the embodiment of the invention shown in the accompanying drawings the manual control means comprises a group of foot switches 304, 305, 306, 307 and 308 in the base 62 as shown in Figs. 1 and 33. Of these foot switches, 304 is a "neutral" switch (N); 306 is an "operation selector" switch (OS); 307 is a "low speed" or "single revolution" switch (SR); 305 is a "high speed forward" switch (HS) and 308 is a "reverse" switch (RS). Of these switches 304 and 308 may be locked in a down position automatically by means of a counterweight latch 309 with which the switches come equipped.

When these latches are swung sidewise with the toe of the operator's shoe the foot switches or pedals snap up to their normal positions. The OS or "operation selector" switch is not to be locked down because this switch merely sets into movement the timer mechanism whereby the respective foot switches may be operated only at their proper timed sequence as, for example, after a ply has been positioned on the drum, whereupon the "operation selector" is to be operated and the timer then permits a succeeding operation to take place.

A timer casing 310 mounted on the housing 38, as shown in Figs. 3, 4, 5 and 6 contains mechanisms driven from a vertical shaft 311 journalled in a tubular casing 312 which is supported at its lower end on a cross-beam 313 extending transversely of the housing 38 at the level of the shaft 36. The vertical shaft 311 is offset from the horizontal shaft 36 and is driven from the latter by a pair of spiral gears 314 and 315, one of which is keyed to the shaft 36 and the other to the vertical shaft 311.

The vertical shaft 311 extends upwardly into the timer casing 310, Fig. 27, and is keyed at its upper end to a spiral gear 316 which meshes with a spiral gear 317 on a horizontal shaft 318 of the timer, as shown in Figs. 26, 27 and 28. The pitches of these various gears are such that the timer shaft 318 rotates at the same speed as the horizontal driving shaft 36 of the drum, the timer shaft 318 making one complete revolution for each revolution of the drum shaft 36 and in the same direction.

The timer shaft carries a number of cams 319–329, eleven being shown by way of example in the drawings, which are mounted on the shaft and rotate with it. Certain of these cams 319, 322, 324, 327, 329' and 329", are merely cylindrical discs and act as spacers between other cams 320, 321, 323, 325, 326, 328 and 329, which are larger in diameter than the spacer cams and have notches 330 provided in their cylindrical surfaces, each cam having one or more notches placed at a predetermined angular position relative to the notches of the other cams. As these cams are mounted on the shaft 318, they receive one rotation for each rotation of the main drive shaft 36. Each cam serves in turn to support a switch arm 331 which travels successively or step-by-step lengthwise of the timer shaft and above each respective cam or spacer to permit the switch arm to drop when the respective notch 330 comes uppermost. The spacers permit the switch arm 331 to drop at any position of the timer shaft. The switch arm 331 moves from right to left, as shown in Fig. 26, or from left to right, viewed from the opposite side, as shown in Fig. 31. When it is in starting position the end of the switch arm is above the initial spacer 319. As the switch arm 331 is brought to the successive steps in its passage from initial to final position it extends in succession over each one of a series of corresponding switches 332 to 342 which are mounted between a pair of inclined posts 343 and 344.

These switches may be of any suitable type, those shown being known as micro switches.

A cross bar 345, Fig. 27, below the switches 332 to 342 secures the uprights 344 and 343 together. The switches are secured in position between the posts 343 and 344 by bolts 346 extending therethrough. The posts are in turn supported at their upper ends on a rod 347 secured between coned pivot pins 348 and 349, Fig. 27, in transverse partitions 350 and 351 of the timer frame. The lower ends of the posts 343 and 344 rest on the floor of the timer casing.

The micro switches 332 to 342 together with the foot switches or pedal switches 304 to 308 and other switches control various electric circuits, Fig. 33, to govern the successive operations of the machine.

One of the circuits for starting and stopping the driving motor 47 is controlled by a micro switch 352, Fig. 28, mounted on the arm 331. This switch is normally open or in the position in which the motor 47 is not running. It is closed, and the motor started when a spring arm 353 is raised and lifts a stem 354 of the switch 352. The free end of the spring lever 353 carries a roller 355 which rests in succession on the surfaces of the cams 319 to 329 and is lowered and the circuit open when the roller rests on one of the spacer cams 319, 322, 324, 327 or in one of the notches 330 and is lifted to close the circuit when the roller is lifted by one of the cams 320, 321, 323, 325, 326 or 328.

To accomplish the step by step movement of the switch arm it is resiliently urged forwardly lengthwise of its shaft and is restrained by a series of stepped stops rising successively from one step to the next.

To permit or provide longitudinal step by step movement, the switch arm 331 is rotatably mounted on a collar 356 which in turn is slidable on a squared rock shaft 357 journalled at its opposite ends in bearings 358 in the partitions 350 and 351. The switch arm may rock in a vertical plane on the collar 356 and it may slide horizontally together with the collar. The collar and squared shaft 357 may rock on the horizontal axis of the shaft independently of the vertical position of the switch arm 331. The collar 356 and switch arm 331 are continuously urged longitudinally of the squared shaft 357 by means of a pneumatic cylinder 361 and piston 362, Fig. 27, supplied with air under pressure through an inlet pipe 363.

The air pressure applied to the piston 362 is transmitted to a pulley 364 carried on the end of the piston. The movement of the pulley 364 is transmitted to the switch arm 331 by means of a cord 365 secured at one end in an anchor 366 bolted in the partition 350 and passing over the pulley 364, thence successively over pulleys 367 and 368 mounted in bearings on the partition 350, Figs. 24 and 25, thence lengthwise of the casing to the switch arm 331 about which it is wrapped and thus secured.

To hold the cord 365 taut, it then continues over pulleys 369 and 370 journalled in bearing brackets in the opposite partition 351 thence in the opposite direction about the pulley 364 and then back to the partition 351 where the end of the cord is secured at 371, Fig. 27. The anchor 366 may be tightened to give the cord any desired degree of tautness. The air pressure on the piston 362, therefore, continuously urges the piston and pulley 364 to the right, as viewed in Fig. 27, and accordingly to draw the switch arm 331 and its supporting collar to the left on the squared part of the shaft 357.

The switch arm and its supporting collar are restrained from sliding on the squared shaft 357 by means of a stem 372 which extends from a ring 373, keyed or pinned on the collar 356, outwardly through a diagonal slot 374 in the timer casing or housing and having a lower edge formed in a series of steps 375 corresponding to the number of cams 319–329", there being one step for each cam. As shown in Fig. 26 the hub of the switch arm 331 is confined between the ring 373 and a shoulder 376 of the collar so that it is held in fixed longitudinal position on the collar 356 while being rotatable thereon.

To permit the collar and its switch arm 331 to slide on the squared shaft 357 from one micro switch cam to the next, the arm 331 must be lifted from one step of the slot 374 to the next. For this purpose a ratchet wheel 377 is mounted on the shaft 357 near the partition 350 and is keyed or pinned in position on the shaft 357. The ratchet wheel is rotated or advanced tooth by tooth by means of a pawl 378 pivoted between the arms of a pair of levers 379 pivotally mounted on the hub of the ratchet wheel. The pawl 378 extends beyond its pivotal connection to the levers 379 and the extending end 380 rides against a cam plate 381 secured to the side of the partition 350 and so shaped as to lift the pawl out of engagement with the ratchet wheel near its upward clockwise swing, Fig. 29, and to permit it to tilt into engagement at a predetermined point in its counterclockwise swing and thus to insure that but one tooth will be advanced for each rocking of the lever.

A rocking movement is transmitted to the levers 379 from an air or pneumatically operated piston 382 in a cylinder 383, Figs. 26 and 29, through a transmission comprising a bell crank lever, one arm 384 of which is slotted at one end to receive a pin 385 on the stem of the piston 382, and the other end of which is mounted and pinned on a stub shaft 386 journalled in and extending through the partition wall 350 and having an upright arm 387 fixed on said hub on the opposite side of the partition and connected to the upper arm of the levers 379 by a connecting link 388.

Accordingly, when air is admitted to the cylinder 383 through a pipe 389 and electromagnetic valve 390, Figs. 29 and 33, the piston rises swinging the bell crank lever and the pawl-carrying levers 379 counterclockwise and advancing the ratchet wheel 377 one tooth or one step and thereby lifting the stem 372 one step in the slot 374; thereupon the piston 382 through the cord 365 pulls the switch arm 331 on the squared shaft 357 from one cam to the next.

The upward movement or throw of the piston 382 may be controlled by a set screw 391 on a bracket 392 extending upwardly from the cylinder 383, the set screw being provided with a lock nut 393 to lock it in set position. Through this arrangement the pawl 378 can be given the proper throw forward.

To position the lever arm accurately with respect to the successive micro switches, a rack bar 394, Figs. 26 and 28, is secured between the partitions 350 and 351 and has on its upper edge a series of spaced notches, one for each cam. Before the switch arm can move sidewise or axially on the squared shaft 357 it must be lifted above the notches of the rack bar. The switch arm may be lifted above the rack bar by means of a pneumatic cylinder and piston 395 and 396, Figs. 26 and 30. The upward movement of the piston is limited by a set screw 397 on a bracket 398 extending upwardly from the cylinder and having a lock nut 399.

The movement of the piston is transmitted to a crank arm 400 jointed to the upper end of the piston 396 and pinned to a rock shaft 401 extending through and journalled in suitable bearings in the partition walls 350 and 351. Between the partitions the rock shaft 401 has a pair of spaced arms 402 and 403 carrying a rod 404 parallel with the shaft 401 and extending through a slot 405 in the end of the switch arm 331 so that the movement of the piston 396 and the rock shaft 401 and rod 404 is transmitted to the switch arm to swing the latter upwardly free of the switches 332—342 and rack bar 394 and thence downwardly onto the succeeding cams, switches and notches of the rack bar.

Electric operating circuits

The various elements of the tire building apparatus are controlled by electric circuits shown diagrammatically in the wiring diagram of Fig. 33.

This diagram shows the control circuits only, the wiring of the main driving motor 47 and its starter panel and stitcher motor 272, for example, being omitted as they are, or may be, of standard construction.

In this circuit certain elements, such as control relays, control other elements, such as switches, in more than one circuit or in a circuit quite distant in arrangement from that of the controlling solenoid and, therefore, in order to avoid a confusing and complex crossing of the lead wires or lines in the diagram, the switch or switches have been separated spacially from their respective control solenoids or electromagnets, but marked with the same reference numerals so that the relationship shall be readily apparent.

Fig. 33 shows one method of wiring to accomplish a given result. It is possible to accomplish the same results by various other methods which would require a different wiring diagram.

The controlling solenoids have been shown in conventional manner, but in some cases as, for example, in the forward and reverse, and high and low controls for the driving motor 47, there are no conventional diagrams and these elements have been indicated by a circle and appropriate letter.

As shown in Fig. 33, the circuits are between and connect a pair of lead wires 406 and 407 of suitable voltage and current. For example a 110 volt 25 cycle circuit has been employed.

In the initial or starting position the microswitch arm 331 is in its initial position over the microswitch 332. The beads are first installed on the bead setting rings by hand and "gassed" or moistened with gasoline.

During this operation the neutral pedal 304 will have been locked in its down or lowered position— this energizes the electromagnet of an electromatically controlled switch 500 energizing coil 427 through line 426, releasing motor brake 60 and energizes the coil 501 which releases air from cylinder 361, allowing arm 331 to move longitudinally in either direction. Also, it permits an electric current to pass through a conductor 408 and thence through an electromagnet of the magnet switch 409, which closes the main switch 407. Branch circuits through microswitch 340 serve to maintain the current normally through the electromagnet 409 and to close the circuits as long as this micro-switch is in closed position. In locking down pedal 304 the circuit is completed through 414 energizing coil 415, which admits air to cylinder 395, which in turn raises arm 331 out of contact with micro switches 332 to 342.

When the beads have been applied to rings the pedal 304 is released, the micro switch 332 being closed by the switch arm 331, a current then passes from the main 406 through a branch circuit 410 and thence through the high speed control 411 in a conductor line 412 and thence to the main 407. The drum therefore expands and continues to rotate. Cement may be applied by hand to the shoulders of the drum during this rotation.

The operation selector foot switch 306 is then depressed closing the circuit through the conductor wire 413 and thence through the conductor wire 414 and an electromagnet 415 controls admission of fluid to the cylinder 395, thence the current returns to the main 407. The lifting of the piston 396 in the cylinder 395 lifts the switch arm 331 and the timer indexes with the switch arm 331 above the next, or No. 2, micro switch 333 at the same time the micro switch 352 on the switch arm 331 is closed closing the circuit through a branch wire 416 and the low speed control 417 of the motor 47. The motor and the drum 35 rotate forwardly at a low speed for a part of a revolution and stop at a predetermined position, depending on the setting of the notch in the cam 320 at which point the dropping of the spring arm 353 into the notch opens the circuit through the branch 416 and at the same time closes a circuit through a branch wire 418 and electromagnet switch 419. The magnetic switch 419 closes a shunt circuit 420 about a switch 421, that is opened by depressing the low speed foot switch 307 and thereby maintains a circuit through the magnetic switch 419 so long as the micro switch 352 maintains the circuit closed; at the same time it closes a circuit through a branch circuit 422 containing the low speed foot switch 307 so that this circuit will be closed remaining open through foot switch 307.

As the traveling switch arm 331 drops it closes the micro switch 333 closing a circuit through the branch wires 423 and 424 through the electro magnet 86 controlling the shifting of the supply roll 79 and table 83. Concurrently the bead arm moves forwardly into position. Ply stock is now drawn from the turret and guided onto the drum by hand and the leading corner of the bias cut ply is "tacked" to one of the shoulders on the drum which has been coated with cement. Thereupon the operator presses the slow speed switch 307 establishing a circuit through the branch line 422 and the low speed motor control pedal. The motor and drum having been set in rotation this low speed pedal may be released whereupon the drum will continue to rotate for a complete revolution, whereupon the micro switch 352 will again be opened by the dropping of the wheel 355 into the notch 330, whereupon the circuit will be broken through the branch 416 and the motor will stop, inasmuch as the release of the switch 307 has also broken it through the branch 422.

The low speed control 417 of the motor 47 also controls a switch in branch circuit 425 leading to a branch circuit 426 and through an electromagnet 427 controlling the motor brake 60 to apply the brake immediately. The ply stock is then torn off and laid back on the pan 83 of the turret and the ends of the first ply are then spliced on the drum.

Operation selector foot switch 306 is again depressed, whereupon the timer indexes as before bringing the switch arm 331 above the third micro switch 334.

As the switch arm 331 closes the micro switch 334 it also closes a circuit through a branch wire 428 and an electromagnetic switch 429. The switch 429 controls the reversing circuit of the motor, which had been closed from a branch line 430 through the switch 429 to a branch 432 and the reverse control 63 of the motor. The closing of the circuit 428 through the electromagnetic switch 429 causes the circuit between the wires 430 and 431 to be opened, and a circuit from the wire 430 closed through a wire 432 and the reverse control mechanism 63 of the motor 47. The drum, therefore, rotates in reverse at a low speed for one-quarter revolution, the notch in the cam 321 having been set for this purpose and stops. Also the second micro switch 333 having returned to its normal open position and the circuit through the supply shift control valve 85 having been opened, the supply pan shifts back giving the required step off.

Concurrently with the motion of the drum, described above, the stock resting on the drum is carried under the roll 103 of the turret mounted below the pan 99. The leading corner of the bias cut ply is tacked to the first ply. The low speed lever 307 is then depressed and the drum makes a three-quarter revolution in the reverse direction coming to a stop for splicing on top of the drum by the roll 106. The second ply is torn off and laid back on the turret pan 83 and the second ply splice is complete. By this method the bias cut cord angle of the second ply is opposite that of the first ply.

The operation selector foot switch 306 is again depressed and the timer again indexes, bringing the switch arm 331 above the fourth micro switch 335. This micro switch is thereby closed, closing a circuit through a branch wire 434 and an electromagnetic switch 435 which closes a circuit through a branch line 436 and the ply turndown control electromagnetic switch 165. It also closes circuit through 428 and coil 429 which in turn close circuit through branch 430, contactor 429 and branch 422 and reverse coil 63. This sets in turn a ply turn down mechanism.

Preceding this ply turndown hand operated stitchers may be applied to the undersurface of the drum. Inasmuch as the cam 322 is a notched cam the single revolution micro switch 352 on the arm will control the drum for one revolution.

The operation selector switch 306 is thereupon again closed and the timer indexes, bringing the switch arm 331 above the fifth micro switch 336 and the fifth cam 323, which is a spacer type cam of small diameter. The arm 331 thereupon closes the micro switch 336 and the branch circuit 437 and thus through the electromagnetic switch 438. The electromagnetic switch 438 controls and closes a branch circuit 439 through the bead setting control electromagnet 186. There is also in the circuit 439 a hand push button which must also be depressed; this for safety purposes. The bead rings are thus brought against the ends of the drum setting the beads in position. A pressure switch 440 in the circuit 437 is opened as the beads are pressed against the ends of the drum, whereupon the bead rings are returned to their normal "out" position. The beads having been set the selector foot switch 306 is depressed, the timer indexes, the switch arm 331 then brought over the sixth micro switch 337 and the corresponding cam 324. This cam 324 is one of the spaced type and permits the switch arm 331 to close the micro switch 337 continuously. A circuit is then closed through the branch wires 441 through the electromagnetic switch 442 which latter closes a circuit through a branch wire 443 to the circuit 412 and the high speed motor control 411, thereby setting the drum into rotation at a high speed at the same time the electromagnetic valve 209 brings the turnover mechanism arms 201 and 202 into proper position.

A switch 444 is closed by the upward movement of the arms through a branch circuit 445 and the electromagnet 221 to cause the turnover disks 216—225 to turn the plies over the bead. When the turnover has been completed the operation selector foot switch 306 is again depressed and the timer indexes to bring the switch arm 331 above the seventh micro switch 338 and the seventh cam 325, which is of the notched type. The micro switch 352 on the switch arm 331 thereby closes the circuit through the branch wire 416 and the low speed control 417 setting the motor into low speed rotation, and as the switch 429 closes the circuit 431 and breaks the reverse circuit 432, the motor and drum rotate slowly in a forward direction until the switch arm 331 drops into the notch. As the micro switch 338 is closed it connects the main 406 through a connecting wire 446 with the branch 424 and the turret control electromagnetic valve 110 shifting the turret to the stop off for the third ply. The upper turret supply pan 85 is then raised and the ply stock is drawn from the lower pan 99 and tacked to the surface of the second ply. The foot switch 307 is then again depressed, starting the motor in low speed through the branch circuit 422, whereupon the micro switch 352 is closed and maintains the driving motor and drum in rotation when the switch 307 is released.

The rotation of the drum then continues under low speed applying the third ply until a complete revolution is completed and the micro switch 352 is opened by the dropping of the roller 355 into a notch, thereby stopping further rotation of the motor. The third ply is thereupon torn off and the end placed back on the turret pan while the ply on the drum is spliced. This completes the application of the third ply.

The operation selector foot switch 306 is then again depressed and closed whereupon the timer indexes and immediately the seventh micro switch 338 is opened breaking the circuit 424 through the turret control magnetic valve 110 and the turret swings back to its former position bringing the fourth ply in place for application to the drum; thereupon the fourth ply stock or fabric is drawn over the lower pan 99 and about and under the roller 103 and the leading corner is tacked to the third ply.

The switch arm 331 is brought over the eighth micro switch and the eighth cam 326, which is of the notched type, thereby closing a circuit through a shunt or connecting wire 447 from the main 406 to and through the branch circuit 428 and the reversing electromagnetic switch 429 which thereupon opens the circuit through the forward branch 431 and closes it through the reverse branch 432 and the reversing device 63.

At the same time the micro switch 352 on the switch arm 331 is closed, inasmuch as the spring arm 353 is lifted by the cam, the circuit through the branch wire 416 and low speed control 417 is closed and the motor, therefore, rotates in reverse at a low speed until the spring arm 353 drops into the notch, whereupon the circuit 418 is broken and the motor stops. This rotation is one-quarter of a revolution.

The stock secured to the third ply on the drum is thereby carried under the turret roll 103. The low speed foot switch 307 is again depressed and closed and the drum makes three-quarters of a revolution in reverse direction thereby completing the fourth ply. The ply stock is then torn off and laid back on the turret pan 99 and the end of the ply spliced on the drum; thereupon the selector foot switch 306 is depressed and the timer again indexes bringing the switch arm 331 over the ninth micro switch 340 and the corresponding cam 327. A circuit is thereby closed through the micro switch 340 and a branch wire 448 and through the neutral switch which is closed. At the same time the micro switch 352 on the arm 331 is closed, closing the circuit through 416 and low speed motor 417 and rotating the low speed motor part of a revolution until the notch in the cam comes below the spring arm 353 and the micro switch 352 is again opened stopping further rotation of the motor and drum.

The drum is then in position for the application of the breaker and chafer supply strips. At this point also the arm 331 opens the ninth micro switch 340, which is normally closed, breaking the circuit through a branch wire 448 and causing the current to go through a shunt circuit 449 containing a relay switch 450 of an electric-eye control so arranged that this switch is opened only if the breaker, or if one of the chafer strips, is absent from the supply whereupon the circuit will remain open opening the switch 409 until the chafer or breaker strip is placed in position. This prevents the supply stand of the breaker and chafer strips from becoming unthreaded.

The operator then takes the chafer and breaker strips to the fourth ply, ready for application. The low speed foot control switch 307 is then depressed starting the drum and motor, whereupon the switch 352 is closed until a complete revolution has taken place whereupon this switch is opened by the dropping of the roller 355 and spring arm 353 to notch on the cam. The operator then severs the chafer and breaker strips returning the ends of the chafer and breaker whereupon the ends of the chafer and breaker on the drum may be spliced.

The selector foot switch 306 is depressed and the timer again indexes bringing the switch arm 331 over the tenth micro switch 341 and corresponding cam 328. The micro switch 352 is closed and the drum rotates forwardly at low speed until a notch comes in place below the roller 355, thereby permitting the switch 352 to open and stop the further rotation of the drum. The drum is then in position for the tread splice.

As the arm 330 drops the tenth micro switch 341 is closed closing a circuit through a branch switch 451 and an electromagnet 142 of the tread pan and thereby actuating this tread pan to move forwardly and bring the tread strip into position for application to the drum; at the same time the micro switch 341 opens a switch arm 452 in a circuit 453 through an electromagnetic control switch 454 which normally closes the circuit 412. The circuit through the electromagnet 454 may, however, be maintained closed by a shunt wire 455 and the tread safety switch 143 on the tread pan which is opened, if there is a supply of tread on the pan, but is closed when the tread has been removed. The opening of the circuit through the electromagnetic switch 454 opens the circuit 412 and prevents high speed rotation of the motor until the tread is entirely removed from the tread pan. The operator then advances the tread by hand and tacks it to the fourth ply of the tire. The foot switch 307 is then closed and the motor makes a complete revolution to apply the tread. The tread splice is then made and stitched by hand.

The selector foot switch 306 is then depressed, the timer again indexes bringing the switch arm 331 about the eleventh micro switch 342 and the corresponding cam 329. The closing of the micro switch 342 closes a circuit 456 through an electromagnetic switch 457 which in turn controls a shunt circuit 458 from the main 406 to the wire 412 and the high speed motor control 411. The motor and the drum, therefore, rotate at high speed forward.

Paralleling the branch circuit 456 is a circuit 459 through an electromagnetic switch 460 and the out-limit switch 294 of the tread stitcher mechanism. The circuit 459 is normally closed by a switch 461 connected to the switch 342 and energizes the magnet 460. This magnet when energized also closes a switch 462 in a shunt circuit 463 by-passing the switch 461 so that the circuit is maintained and the magnetic switch 460 energized so long as the outlimit switch 294 is closed. Once the circuit is broken it remains broken so long as the arm 331 is above and closes the eleventh micro switch 342.

The electromagnetic switch 460 also closes a branch circuit 464 leading from the branch 456 through the electromagnetic valve of the tread stitcher control 465 which controls the admission of fluid into the cylinder 241 to tilt the stitcher disk into contact with the tread on the drum. The branch circuit 464 is also connected through a branch circuit 466 and an electromagnetic starting switch 467 which is in parallel with the tread stitcher controlling magnet 465.

The switch 467 controls the starter winding of the stitcher motor 272. The starter winding of the stitcher motor is connected to the branch circuit 468 and in-limit switch 469 to the main 406 and through the branch circuit 470 to the main 407. The starter and circuit comprise two branches 471 and 472 spanned by a starter winding 473. When the control magnet 463 is energized current passes through the parallel circuits 471 and 472 and starter winding 473 in one direction to cause the motor to run forwardly. For example, it may take the lower circuit 472 to the winding 473, then pass the branch 471 to the return branch 470. At the starting position the in-limit switch will be opened but an alternative connection will be established through a pressure switch 474 in parallel therewith, but which will be open as soon as the stitcher motor starts and closes the in-limit switch; thereafter the motor continues to run forwardly until the nut 287 opens the out-limit switch 294, whereupon the switch 460 is opened, the electromagnet 467 of the reversing mechanism is opened thus opening the switches normally closed in the branch circuits 471, 472 and closing the opposite switches and thus reversing the motor. Thereupon the motor runs in reverse until the nut 287 reaches and opens the in-limit switch and thus interrupts the circuit and stops the motor.

When the switch 460 is opened it also breaks the circuit through the tread stitcher control magnet 465 and the stitcher disks fall away from the drum during the return or reverse rotation of the stitcher motor and stitchers. The drum 35 continuously turns at high speed. Meanwhile the turret has returned to its original position. During the high speed rotation of the drum the operator may turn the third and fourth plies and chafer under the bead with a hand roller.

The selector foot switch 306 is again depressed, the timer indexes and the operator locks the neutral pedal 304. In this position the collapse push button 475 is closed closing a circuit through a branch 476 and electromagnetic switch 477. The switch 477 closes a circuit through a branch wire 478 from the main 406 to the wire 412 through the high speed control 411. Also it closes a switch in a circuit 479 from the main 406 to the wire 428 and to the reversing switch 429 thereby causing the motor to run in reverse at high speed. The switch 477 also closes a circuit through a branch wire 480 from the main 406 to a circuit 481 comprising the quill brake control magnet 42. This causes a reverse movement between the quill 37 and the shaft 36 in the direction to collapse the drum.

As soon as the drum is collapsed a pressure switch 482 in the circuit 412 is opened thereby stopping the current to the main drive motor and the collapse push button 475 may be reversed. At this time also the bead arm 176 drops back to its starting position. The tire may then be removed by hand. The selector stem 372 of the timer may then be moved back to its original starting position.

With the above invention, therefore, all of the elements that go into the making of a tire are brought with exactness to the proper position for application to the forming drum in their proper sequences. It is only necessary for the operator to start the successive plies on the drum and then to operate the proper foot pedal. The drum will then be automatically operated, either to give the exact revolution necessary for each ply or the rapid revolution for the stitching and turning of the plies.

Certain of the operations might be accomplished manually as, for example, the turning down of the ends of the plies before application of the beads and then the turning of these plies over the beads. However, the particular turndown and bead turnover mechanism co-operate with the other elements of the combination in providing for a rapid and accurate accomplishment of these functions as a part of the cycle of the machine.

Similarly, the various plies and breaker strip, treads, etc., could be brought to the former by other mechanisms, but the mechanism timed by the timer and operated in proper sequence with the former drum operating mechanisms provides a quick and expeditious way of bringing these elements to the proper position and placing them accurately on the drum, thereby permitting the sequence of operations to take place through the timer without a break or interruption. Also the turret feed device facilitates the feeding of materials in orderly succession and facilitates the advantages of placing of the mechanism with relation to a central ply.

Certain operations, such as the stitching together of successive plies may take place between the wrapping of the plies and this may be accomplished by ordinary ply stitchers, not shown, as they are standard equipment and are used in the ordinary manner in the present apparatus.

Although the timer mechanism times each of the operations in its sequence, it may be set back or ahead to any stage if conditions so require. When the neutral pedal or foot switch 304 is locked down the main shaft brake is released and the drum may be rotated freely by hand in either direction. The time arm 331 is in its upper position and all of the fixed micro switches mounted beneath it are in their neutral position. In effect the selector or timer mechanism is thereby rendered inoperative allowing the tire builder to use any foot switch or combination of foot switches in the same manner as is customary when operating a standard tire building machine.

Also when the neutral pedal or foot switch 304 is depressed the electrical circuits may be reset to their operating condition after the safety stop has been used.

The apparatus, therefore, not only provides mechanism for the successive operations required for the building of the tires in their proper sequence but enables the operator to modify or take charge of the tire building whenever necessary.

The turret provides means for supplying the fabric stock to a convenient position for application to the forming drum and serves to constantly replenish or maintain a supply of stock.

When the stock is exhausted from the end of the turret over the tire building drum, it is only necessary to revolve the turret 180°, swinging the exhausted end to a position for replenishment, and to bring a freshly loaded end into position. This rotation of the turret is accomplished by pressing a push button (not shown) mounted on the base of the tire building machine which energizes the coils, namely a pair of opposite acting coils 529 and 530 of the four-way valve 110, which in turn admits air to cylinder 108 or 109, depending on which end of the turret is to be indexed.

Micro switches 525 and 526 are mounted on arms 77 of the turret. Fig. 10. The current through the electromagnet 110 is controlled by micro switches 525 and 526 on the arms 77 of the turret, Fig. 10. These switches are closed alternately by lifting the arms so that they clear the tire building mechanism and tread supply when the turret is rotated.

When the push button, shown at 527, Fig. 33, is closed current passes through a micro switch 528 or 531, thence through the coil 529 or 530, depending on the position of the micro switch 528.

The micro switches 528 and 531 are suitably mounted on the pedestal of the turret (Fig. 11) and are controlled by cams 532 and 533 on the rotatable pillar 67. These cams determine which coil, 529 or 530, is energized, depending on which direction the turret is to rotate.

To maintain the circuit closed, after the closing of the push button 527 until the complete half revolution of the pillar 67 is made, a circuit is established through the micro switch 528 or 531 upon closing the push button 527 through a micro switch 534 and the coil of the magnetic switch 535 which closes a branch circuit 536 about the push button 527 to the micro switches 528 and 531. Upon release of the push button a circuit is thereby maintained through the electromagnetic switch 535 and circuit 536 until the micro switch 534 is opened by the cams on the rotating pillar 67.

Control valves may be provided for the cylinders 108 and 109 to cushion the momentum of the pistons 106 and 107 of the rotating or swinging structures of the turret. Any suitable means may be provided for this purpose.

The offsetting of the arms 71—75 of the turret so that the end to be loaded is at one side of the tread and chafer strip supply rollers rather than directly above it, provides a clear space above the loading end of the tread and chafer supply so as to enable the ply fabric and chafer and tread to be supplied simultaneously without interference.

The liner roll up rolls 80 may also be provided with a "free wheeling" arrangement whereby when the ply fabric is drawn from the roll 79, the roll 80 rotates freely to wrap up the liner fabric; but when rotating the roll 79 to wrap a supply of ply fabric thereon a clutch engages the roll with a brake device which puts the liner fabric under tension. Such a clutch may be of any suitable type as, for example, one having rollers or balls which clutch the clutch elements when rotated in one direction but release them when rotated in the opposite direction.

In the embodiment of this invention as shown in Figs. 34 and 35, the liner roll 80 is in the form of a hollow cylinder supported on its opposite ends on a stationary shaft 540 which is secured to one of the swinging supporting arms 81, not shown, in such a manner as to prevent rotation with the roll 80 but to permit a limited longitudinal movement.

The cylindrical shell of the roll 80 is supported on the shaft by means of ball bearings 541, the outer raceway of which is secured to the roll 80. At the end of the roll, shown in Fig. 34, the inner raceway of the bearing is mounted on a sleeve 542 carried within a bearing on the arm 81 and mounted on the shaft 540 by key, or otherwise, to permit it to move longitudinally but without rotational movement.

The sleeve 542 extends into the roll 80 and abuts at its inner end the outer hub 543 of a clutch. The opposite face of the clutch element 543 is closed by an end plate 544 forming a support for a thrust bearing 545 between the end plate 544 and a clutch member 546. This clutch member has an extension 547 within the outer clutch member 543, and at its opposite end has a flange 548 which has an asbestos or other friction face 549.

The plate 544 and friction surface are in contact with a partition plate 550 rigidly or integrally secured to the cylindrical shell 80. The plate 544 and friction surface 549 are pressed against the partition plate 550 by means of a spring 551 confined between the end of the sleeve 542 and lock nuts 552 on a threaded end of the shaft 542. By adjusting the lock nuts the pressure of the friction surface on the partition 550 may be adjusted.

When the two clutch elements 547 and 543 are unclutched the friction face 549 rotates freely with partition 550 and shell 80. This is the case when the liner strip is being wound on the roll inasmuch as a free rolling with little resistance is desired when the bias cut fabric is being drawn from the supply roll. When the liner is drawn from the liner roll, however, in order to be wrapped onto a supply roll being filled, it is desired to draw the liner roll with a controlled tautness. For this purpose the two clutch elements are clutched or engaged by means of rollers 553 contained in approximately tangential recesses 554 in the outer clutch 543 in such manner as to wedge the rollers 553 when the clutch element 543 is rotated in one direction relative to the clutch element 547 and to release the clutch elements when they are rotated in opposite directions. The rollers 553 are urged toward engaging or clutching position by means of spring pressed plungers 555.

It will be understood that the above mechanism is made up of a number of combinations, or sub-combinations, all of which contribute to the most effective operation of the tire building method, but that these sub-combinations are applicable to a number of other combinations or devices and also that equivalent sub-combinations may be substituted to accomplish the same functions.

What I claim is:

1. A tire building machine which comprises a forming drum, means to rotate and stop said drum at successive intervals, means to bring tire elements successively into position for application to said drum between said intervals of rotation, and a timer to control the successive rotation and stopping of said drum and the operation of said tire element positioning means relative to the operation of said drum rotating and stopping means.

2. A tire building machine which comprises a forming drum, means to rotate and stop said drum at successive intervals, means to bring tire elements successively into position for application to said drum between said intervals of rotation, a timer to control the successive rotation and stopping of said drum and the direction of rotation of said drum and the operation of said tire elements positioning means relative to the operation of said drum rotating and stopping means, and manual means to control the starting of said drum.

3. A tire building machine which comprises a tire forming drum, means to rotate and stop said drum, a supply means to bring tire elements successively into position for application to said drum, a control means comprising electric circuits to control the successive rotations of said drum in forward and reverse directions and to control the bringing of successive tire elements to said drum in timed sequence to the intervals of rotation of said drum, a timer to select successive circuits to be energized and to break said circuits severally at fixed positions of said drum and manually controlled means to close said circuits.

4. A tiring building machine which comprises a tire forming drum, means to rotate and to stop said drum, a supply means to bring successive tire elements successively into position for application to said drum, a control means comprising an electric circuit to control said drum, said circuit comprising a switch, a series of cams to operate said switch successively and severally, separate electric circuits each comprising a switch to control said respective means for bringing said tire elements into position relative to said drum, a switch arm to actuate the switches of said circuits severally and means to bring said cam operated switch and said switch arm into successive operative positions relative to said cams and said switches respectively.

5. A tire building machine which comprises a tire forming drum, means to rotate and to stop said drum, a supply means to bring successive tire elements successively into position for application to said drum, and means to control the rotation of said drum in forward and reverse directions and the actuation of said tire element supplying means in timed relation to said successive rotations comprising an electric circuit having a cam operated switch to control the stopping of said drum rotating means, a series of cams to operate said switch in succession and severally, means to rotate said cams in fixed relation to the rotation of said drum, a series of switches to control said tire supply means and a switch actuating arm carrying said cam operated switch and movable in steps from one of said series of switches to the next and carrying said cam operated switch from one cam to a succeeding cam.

6. A tire building machine which comprises a rotatable tire forming drum, a reversible electric motor to rotate said drum, means to bring plies of tire fabric in succession to position for application to said drum, means to bring a pair of tire beads to position on plies on said drum, means to turn said plies on said beads, means to bring a tire tread to position on said plies on said drum, a control circuit comprising a cam operated switch to control the stopping of said tire forming drum, a series of cams to operate said switch and rotating in fixed relation to said drum, control circuits to control the bringing of said plies, tread and beads to said drum in fixed succession and comprising electric circuits and switches, a switch arm carrying said cam operated switch and movable in succession from one to the next of said circuit switches while carrying said cam operated switch from one to a successive cam and manually operated means to move said switch arm in successive steps and to actuate said switch arm.

7. The apparatus of claim 6 in which certain cams of said series act to stop the rotation of said drum at predetermined positions of rotation.

8. A tire building machine comprising a collapsible drum having a drive shaft and a quill encircling said drive shaft, said drum being expansible and collapsible by relative movements of said shaft and said quill, an electric motor to drive said drum, independently operable brakes for said shaft and said quill and an electric circuit to control said motor and said brakes alternatively.

9. A tire forming machine having a forming drum rotatable on a horizontal axis, a fabric supply turret at one side of said drum and having supply means rotatable about a vertical axis to supply fabric to said drum, a tread supply means below said tire fabric supply means, means to bring said tread supply to position for application of tread to said drum and a timing means to control the successive rotations of said drum and to control the rotation of said fabric supply means and the movement of said tread supply means in timed sequence.

10. A timer for tire building machines which comprises a series of electric switches, a supporting bar extending lengthwise of said switches, a collar slidable on said bar, means resiliently pressing said collar toward one end of said bar, a selector stem on said collar, a series of stepped stops to retain said stem in successive positions lengthwise of said bar, means to lift said stem from one step to another to permit movement of said stem and said collar to successive positions lengthwise of said bar, a switch arm on said collar to actuate said switches in succession and means to actuate said arm in its successive positions.

11. A tire building apparatus comprising a former drum, cams rotating synchronously and in fixed relation to said drum, certain of said cams being notched, a switch arm following on said cams in selective sequence, an electric circuit comprising a switch actuated by said switch arm to rotate said drum when said switch arm is out of the notch of said notched cams and to stop rotation of said drum when said switch arm drops into a notch.

12. The apparatus of claim 11 in which said electric circuit comprises means to reverse the direction of said drum.

13. A tire building apparatus comprising a tire former drum, cams rotating synchronously and in fixed relation to said drum, certain of said cams being notched, a switch arm following on said cams in selective sequence, an electric circuit comprising a switch actuated by said switch arm and having alternate circuits to rotate said drum at a higher and a lower speed of rotation selectively, manually controlled switches to control selectively said alternate circuits, said switch arm closing said circuit to actuate said drum when it is lifted out of the notch of said notched cams and to open said circuit upon dropping into a notch.

14. The apparatus of claim 13 having circuits to reverse the rotation of said drum selectively at either of said speeds of rotation.

15. A tire forming apparatus which comprises a tire former drum, a motor to drive said drum in forward or reverse direction, an electric circuit for controlling the rotation of said motor and drum in either forward or reverse direction selectively at either of two speeds, a cam operated control switch, a switch arm carrying said cam operated switch, a number of separate switches spaced in sequence and individually actuated by said switch arm, a series of cams spaced to correspond to said spaced switches and means to move said switch arm successively to place said cam operated switch in position to be actuated by said several cams and to actuate said several spaced switches to control the rotation in sequence of said drum.

16. The apparatus of claim 15 in which said circuit also comprises manually operated switches to control said circuit.

17. The apparatus of claim 15 having means to bring tire elements in position for application to said drum and electric circuits and switches operated by said switch arm to control said means.

18. Tire building apparatus which comprises a forming drum, means to rotate said drum forwardly and in reverse at a higher and lower speed, means to start the rotations from relative angular positions of said drum, means to supply tire building fabric to said drum from alternately opposite directions for said alternate reversed rotations of said drum at low speed, means comprising a hydraulic brake to limit said forward and reverse rotations to one complete revolution from said respective starting positions and a timing means to control the rotation of said drum, the application of said brake and the fabric supply.

19. Tire building apparatus which comprises a forming drum, means to rotate said drum in successive rotations of one complete revolution each, means to apply a breaker strip to said drum in one revolution, means to apply a tread strip in a succeeding revolution and a timing means to control the rotation of said drum, said breaker strip supply and said tread supply in timed succession.

20. Tire building apparatus which comprises a forming drum, means to rotate said drum in successive rotations of one complete revolution each, means to apply a breaker strip to said drum in one revolution, means to apply a tread strip in a succeeding revolution and means operating in timed sequence with said revolutions to advance said breaker strip and said tread in timed sequence.

21. A tire building machine which comprises a drum having a shaft, a timer geared to said shaft, a driving motor to drive said shaft in either direction, brakes to stop such shaft and means controlled by said timer to actuate said motor and brake in timed sequence.

22. A timer which comprises a series of electric switches, a supporting bar extending lengthwise of said switches, a collar slidable on said bar, means resiliently pressing said collar toward one end of said bar, a selector stem on said collar, a series of stepped stops to retain said stem in successive positions lengthwise of said bar, means to rotate said bar to lift said stem from one step to another to permit movement of said stem and said collar to successive positions lengthwise of said bar, a switch arm on said collar to actuate said switches in succession and means to actuate said arm in its successive positions, a rack bar having notches to receive said switch arm and position it above its respective switch and means to lift said switch arms free of said notches.

23. A timer which comprises a succession of electric switches, a rotatable bar, a collar in fixed angular position on said bar and slidable lengthwise of said bar and having a selector stem, means urging said collar toward one end of said bar, a plate having a series of stepped notches to engage said stem selectively as said bar is tilted, a ratchet wheel fixed on said bar and actuating means comprising a pawl to engage said ratchet, a switch arm rotatably mounted on said collar to pass successively into actuating position relative to said successive switches and means to actuate said switch bar.

24. Electric timing means for tire building apparatus which comprises a series of electric switches, a switch actuating arm movable successively to positions to actuate a corresponding switch, an electric switch mounted on said arm and notched cams engaging said arm carried switch in successive positions of said arm.

25. Electric timing means for tire building apparatus which comprises a series of electric switches, a switch actuating arm movable successively to positions to actuate a corresponding switch, resiliently acting means to move said arm to successive switches of said series, means having a series of stepped notches corresponding to said switches, said arm having a stem to engage said notches in successive positions to actuate said switches, means to lift said arm free of said switches and means to lift said stem successively from one of said notches to the next.

26. The timer of claim 25 in which said means to lift said stem comprises a ratchet and pawl.

27. The timer of claim 25 having a rack bar notched to receive said switch arm in successive positions over said switches.

28. A tire building machine comprising a rotating forming drum, a cam shaft having a series of successive notched cams thereon, means to drive said cam shaft synchronously with said drum at the same angular speed of rotation, a switch movable lengthwise of said series of cams in successive steps to engage the cams of said series in succession and being opened when engaging the notches of said cam and a control electric circuit through said switch to stop said drum when said switch is open.

29. A tire building machine comprising a rotating forming drum, a cam shaft having a series of successive notched cams thereon, means to drive said cam shaft synchronously with said drum at the same angular speed of rotation, a switch movable lengthwise of said series of cams in successive steps, to engage the cams of said series in succession and being opened when engaging the notches of said cam, an electrically actuated brake for said drum and a brake actuating circuit through said switch for actuating said brake when the circuit through said switch is open.

30. A timer for tire building machines having a rotatable forming drum which comprises a shaft driven in fixed relation to said forming drum and at the same angular speed, a series of notched cams on said shaft, a series of control switches paralleling said cams, a movable actuating arm movable to positions to actuate the successive switches of said series, a switch carried by said arm having an actuating means to engage said cams to open said switch when said means engages a notch of said cam, an electric circuit comprising said switch to control the rotation of said forming drum when said switch is closed and a second circuit to control the braking of said drum when said cam engaging means enters a notch of said cams.

31. A timer for tire building machines which comprises a series of electric switches, a supporting bar extending lengthwise of said series of switches, a collar slidable on said bar, means resiliently pressing said collar toward one end of said bar, a selector stem on said collar, a series of stepped stops to retain said stem in successive positions lengthwise of said bar, manually controlled means to lift said stem from one step to another to permit movement of said collar to successive positions lengthwise of said bar, a switch arm pivotally carried on said collar to actuate said switches severally and means to actuate said switch arm in its successive positions.

32. A timer for tire building machines which comprises a series of electric circuits comprising a series of switches, a supporting bar extending lengthwise of said series of switches, cams arranged in a series lengthwise of said bar, a collar slidable on said bar, means resiliently pressing said collar toward one end of said bar, a selector stem on said collar, a series of stepped stops to retain said stem in successive positions lengthwise of said bar, a switch actuating arm on said collar and movable with said collar to position to engage successive switches, a separate switch mounted on said arm and actuated severally by said cams, and manually actuated means to lift said stem from one stepped stop to the next to position said switch arm relatively to the successive switches and cams of said series.

33. A tire building machine which comprises a tire forming drum, means to rotate said drum forwardly and in reverse and to stop said drum, a control means comprising an electric circuit to control said drum, said circuit comprising a cam operated switch, a series of cams to operate said switch successively and severally, a separate electric circuit to control the reversing of said drum and comprising control switches and an actuating arm for said control switches and means to move said cam operated switch from one cam to a succeeding cam and to move said operating arm from one control switch to another.

34. A tire building machine comprising a rotatable forming drum, individual supply means to bring tire elements severally into position on said drum, electrically controlled means for actuating said supply means and for starting and stopping said drum, said electrically controlled means comprising electric circuits and control switches for controlling the successive actuation of said individual supply means, a cam operated switch for stopping the rotation of said drum, a series of cams rotating in fixed relation to said drum to operate the cam operated switch severally to control the stopping and starting of said drum in fixed position, means moving with said cam operated switch to actuate the control switches for said supply means, a manually controlled switch in series with said cam operated switch to start the rotation of said drum and manually actuated means to move said cam operated switch from one of said cams to the next and to move said switch operating means from one switch to the next in succession.

35. A tire building machine comprising a rotatable forming drum, means to bring plies of fabric, tread and bead elements to position on said drum in succession, electric circuits to control the rotation of said drum and the operation of said means and comprising manually operable switches to control said means and the starting of said drum and a cam operable switch to control the stopping of said drum, a series of operating cams for said cam operable switch and a switch arm slidable to position to operate said manually operable switches individually and to move said cam operated switch to position to be actuated in succession by said cams, a selector stem secured to said switch arm, stepped stops to engage said stem successively, means to move said stem longitudinally of the series of switches as released from said stop and manually controlled means to lift said stem from one stop to the next.

36. A tire building machine comprising a rotatable drum, means to bring plies of fabric, tread and bead elements to position on said drum in succession, an electric circuit to control the rotation of said drum, said circuit comprising a manually operable starting switch and a cam operated stopping switch, a series of cams to operate said cam operated switch severally and in succession, a series of electric circuits and control switches to control the bringing to said drum of said fabric, tread and bead elements, a switch arm carrying said cam operated switch and movable successively to positions to operate said control switches, a selector stem secured to and moving with said switch arm, stepped stops to engage said stem successively, means to move said stem longitudinally of the series of switches as released from one stop to the next and manually controlled means to lift said stem from one stop to the next.

37. A tire building machine comprising a tire forming drum, a two-speed reversible motor for driving said drum, a brake for stopping said motor and drum, supply means to bring tire forming elements to said forming drum, electric circuits for controlling said motor and brake and supply means, and comprising a manually operated switch and a cam operated switch to start and stop said motor and to apply said brake respectively, and a series of switches to control the operation of said supply means, a timer rotated in fixed relation to said drum and comprising cams for operating said cam operated switch, each cam having a notch to move said switch to stopping position, the notch of one cam being displaced angularly relative to that of another and a switch arm movable with said cam operated switch to operate the switches of said series severally in succession.

38. Apparatus for applying successive plies of bias cut fabric with a reverse bias to a forming drum which comprises means for rotating said drum alternately in opposite directions, means for supplying bias cut fabric to the rotating surface of said drum in a forward direction, means for turning said bias cut fabric in a reverse turn and applying it to said drum in reverse, a timer to control the rotation of said drum and means to shift said fabric sidewise of said drum when applied in reverse direction.

39. Tire building apparatus which comprises a forming drum, means to rotate said drum in forward and reverse directions, control means for controlling the forward and reverse directions of said drum, said control means comprising a series of co-axial notched cams, means to rotate said series of cams at the same angular speed as that of said drum, means comprising a cam follower for said cams to stop said drum when said cam follower enters a notch in one of said cams, the notches of successive cams being angularly spaced relative to each other, means to shift said cam follower from one cam to the next in succession and means to start the rotation of said drum.

40. A tire building apparatus which comprises a rotatable forming drum, a motor for driving said drum forwardly and in reverse at high and low speeds, supply means to bring tire elements severally to said drum in timed sequence, electric circuits for controlling the speed and direction of said motor and the actuation of said several supply means, said circuits each comprising one of a series of switches, a switch actuating arm movable in steps successively from one switch of said series to the next, manually controlled means to move said arm from one switch of said series to the next, a circuit to control the starting and stopping of said motor and comprising a manually operable switch and a cam operable switch in parallel with said manually operable switch and mounted on said switch arm, a series of cams in parallel relation to switches of said series to open and close said cam operated switch, and means to drive said cams at the same angular speed as that of said drum.

41. The apparatus of claim 40 having a switch in series with said manually operable switch and means to open said series switch when said cam operated switch is closed and to close it when said cam operated switch is open.

42. The apparatus of claim 40 having a brake to stop said forming drum and means actuated by said motor control circuit to release said brake when said motor is rotating.

43. Control means for a rotating tire forming drum which comprises a series of cams driven at the same angular speed as that of said drum, an electric circuit comprising means to control the starting and stopping of the rotation of said drum and comprising a switch controlled severally by said cams to open at one place in the rotation of each respective cam to stop said drum, the said positions for the several cams being angularly displaced relatively to other cams of said series, a shunt circuit about said cam controlled switch and having a manually operated switch and an electromagnetic switch, a circuit parallel to said motor control circuit and controlling said electromagnetic switch, said parallel circuit having cam and manually operable switches in series to open and close when the cam and manually controlled switches of said control circuit are respectively and severally closed and opened and a shunt circuit about the manually controlled switch of said electromagnetic control circuit and having a switch controlled by said electromagnet control circuit to by-pass the manually controlled switch thereof and means to move said cam controlled switch from one cam to a succeeding cam.

44. Control means for a rotating tire forming drum which comprises a cam driven at the same angular speed as that of said drum, an electric circuit comprising means to control the starting and stopping of the rotation of said drum and comprising a switch controlled by said cam to be opened by said cam to stop said drum, a shunt circuit about said cam control switch and having a manually operated switch and an electromagnetic switch, a circuit parallel to said motor control circuit and controlling said electromagnetic switch, said parallel circuit having cam and manually operable switches in series to open and close when the cam and manually controlled switches of said control circuit are respectively and severally closed and opened, and a shunt circuit about the manually controlled switch of said electromagnetic control circuit and having a switch controlled by said electromagnet control circuit to shunt the manually controlled switch thereof.

45. The apparatus of claim 43 comprising a brake for said drum, an electric circuit to control said brake and a switch controlled by said motor controlled circuit to apply said brake when said motor control is in stopped position.

46. A tire building apparatus which comprises a tire forming drum, a motor to rotate said drum, several means to place tire elements for assembly on said drum, electrically operated control circuits to actuate said placing means, said circuits comprising respective control switches, a manually controlled switch, actuating means to actuate said switches in succession, a control circuit for said motor comprising a manually actuated starting switch, a stopping switch and several means synchronized with said motor to actuate said stopping switch in predetermined relative positions of rotation of said drum and means actuated by said manually controlled switch actuating means to actuate said several means in succession.

47. A tire building apparatus which comprises a tire forming drum, a motor to rotate said drum forwardly and in reverse, several means to place tire elements for assembly on said drum, electrically operated control circuits to actuate said placing means and to control the reversing of said motor, said circuits comprising respective control switches, a manually controlled switch actuating means to actuate said switches in succession, a control circuit for said motor comprising a manually actuated starting switch, a stopping switch and several means synchronized with said motor to actuate said stopping switch in predetermined relative positions of rotation of said drum and means actuated by said manually controlled switch actuating means to actuate said several means in succession.

48. A tire building apparatus which comprises a tire forming drum, a motor for driving said drum, a timer comprising a series of cams rotated in synchronism with said drum, an electric circuit having means actuated on closing said circuit to rotate said motor, said circuit having parallel branches in series with said motor actuating means, one of said branches having a switch operated successively by the cams of said series and the other of said circuits having in series a manually operated switch and a switch operated to close when said cam operated switch is open and to open when said cam operated switch is closed.

CUYLER S. McCHESNEY.